United States Patent
Lemay et al.

(10) Patent No.: US 10,379,737 B2
(45) Date of Patent: Aug. 13, 2019

(54) DEVICES, METHODS, AND GRAPHICAL USER INTERFACES FOR KEYBOARD INTERFACE FUNCTIONALITIES

(71) Applicant: Apple Inc., Cupertino, CA (US)

(72) Inventors: Stephen O. Lemay, San Francisco, CA (US); Patrick L. Coffman, San Francisco, CA (US); Tiffany S. Jon, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/270,801

(22) Filed: Sep. 20, 2016

(65) Prior Publication Data
US 2017/0109039 A1    Apr. 20, 2017

Related U.S. Application Data

(60) Provisional application No. 62/243,627, filed on Oct. 19, 2015.

(51) Int. Cl.
  *G06F 3/0488*  (2013.01)
  *G06F 17/27*   (2006.01)

(52) U.S. Cl.
  CPC ........ *G06F 3/04886* (2013.01); *G06F 17/273* (2013.01); *G06F 17/2735* (2013.01)

(58) Field of Classification Search
  CPC .. G06F 3/0489; G06F 3/0237; G06F 3/04886; G06F 17/273; G06F 17/2735
  See application file for complete search history.

(56) References Cited

U.S. PATENT DOCUMENTS

2011/0090151 A1    4/2011  Huang et al.
2011/0285656 A1*  11/2011  Yaksick .............. G06F 3/04883
                                                    345/173

(Continued)

FOREIGN PATENT DOCUMENTS

JP    2009-223513 A    10/2009
JP    2010-217961 A     9/2010

(Continued)

OTHER PUBLICATIONS

Notice of Allowance, dated Apr. 13, 2017, received in Chinese Patent Application No. 201621139602.6, which corresponds with U.S. Appl. No. 15/270,801, 2 pages.

(Continued)

*Primary Examiner* — Mandrita Brahmachari
*Assistant Examiner* — Bille M Dahir
(74) *Attorney, Agent, or Firm* — Morgan, Lewis & Bockius LLP

(57) ABSTRACT

The electronic device has a touch-sensitive display, one or more processors, and memory storing one or more programs configured to be executed by the one or more processors. The one or more programs include instructions for displaying a first keyboard comprising a first set of keys corresponding to a set of characters associated with a first language and a first designated key displayed at a location and associated with a first function. In response to receiving a selection to display a second keyboard, the one or more programs include further instructions for displaying the second keyboard, comprising a second set of keys and a second designated key displayed at the location and associated with a second function different from the first. The second function toggles between keyboards. Selection of any of the second set of keys displays one or more characters corresponding to a second language different from the first.

20 Claims, 41 Drawing Sheets

(56) References Cited

U.S. PATENT DOCUMENTS

| | | | |
|---|---|---|---|
| 2012/0068937 A1* | 3/2012 | Backlund | G06F 3/0237 345/173 |
| 2012/0313858 A1* | 12/2012 | Park | G06F 3/0238 345/171 |
| 2013/0091411 A1 | 4/2013 | Rampson et al. | |
| 2013/0300664 A1* | 11/2013 | Winer | G06F 17/276 345/168 |
| 2014/0164981 A1 | 6/2014 | Colley et al. | |
| 2015/0242392 A1 | 8/2015 | Wisniewski et al. | |
| 2015/0264129 A1 | 9/2015 | Takeuchi et al. | |
| 2016/0062632 A1* | 3/2016 | Adams | G06F 3/04886 715/763 |
| 2016/0275070 A1* | 9/2016 | Corston | G06F 3/0236 |

FOREIGN PATENT DOCUMENTS

| | | |
|---|---|---|
| JP | 2010-538391 A | 12/2010 |
| JP | 2013-145431 A | 7/2013 |
| JP | 2014-067375 A | 4/2014 |
| JP | 2014-207655 A | 10/2014 |
| JP | 2015-503149 A | 1/2015 |
| JP | 2015-028784 A | 2/2015 |
| JP | 2015-172821 A | 10/2015 |
| KR | 1020050037839 A | 4/2005 |
| WO | WO 2011/146740 A2 | 11/2011 |
| WO | WO 2012/101710 | 8/2012 |

OTHER PUBLICATIONS

Patent, dated May 17, 2017, received in Chinese Patent Application No. 201621139602.6, which corresponds with U.S. Appl. No. 15/270,801, 3 pages.

Office Action, dated Oct. 30, 2017, received in Japanese Patent Application No. 2016-205557, 6 pages.

Impress Company, Ltd., "Lesson 07 Let's Learn How to Input Words of iPod Touch", [online], https://dekiru.net/article/1733/, Jan. 14, 2011, 22 pages.

Office Action, dated Nov. 2, 2017, received in Japanese Patent Application No. 2016-200734, which corresponds with U.S. Appl. No. 15/270,801, 6 pages.

Office Action, dated Feb. 19, 2018, received in Japanese Patent Application No. 2016-200734, which corresponds with U.S. Appl. No. 15/270,801, 5 pages.

Patent, dated Mar. 9, 2018, received in Japanese Patent Application No. 2016-200734, which corresponds with U.S. Appl. No. 15/270,801, 2 pages.

Notice of Allowance, dated Dec. 128, 2017, received in Korean Patent Application No. 2016-0132823, which corresponds with U.S. Appl. No. 15/270,801, 3 pages.

Patent, Mar. 8, 2018, received in Korean Patent Application No. 2016-0132823, which corresonds with U.S. Appl. No. 15/270,801, 4 pages.

Notice of Allowance, dated Apr. 16, 2018, received in Japanese Patent Application No. 2016-205557, 5 pages.

Patent, dated May 25, 2018, received in Japanese Patent Application No. 2016-205557, 2 pages.

* cited by examiner

600

602 Display a first keyboard on the touch-sensitive display, the first keyboard comprising: a first set of keys corresponding to a set of characters associated with a first language; and
a first designated key displayed at a location on the touch-sensitive display, the first designated key associated with a first function,
wherein the first keyboard is configured such that selection of any of the first set of keys displays, in a text region, one or more characters corresponding to the first language

604 Any of the first, second, and third designated keys is any one of a Caps Lock, shift, or formatting function key of the selected respective keyboard

606 Selection of any of the first, second, and third designated keys is enabled by a single tap selection on the touch-sensitive display

608 First and second set of keys utilizes roman script

610 The first language is associated with a first autocorrect dictionary, and the second language is associated with a second autocorrect dictionary

612 Receive a selection to display a second keyboard

614 Receive a selection of the second designated key to display the third keyboard

616 Display the third keyboard, the third keyboard comprising:
a third set of keys corresponding to the set of characters associated with the first language;
a third designated key disposed at the location, wherein the third designated key is the same as the second designated key,
wherein the third keyboard is configured such that selection of any of the set of keys displays, in the text region, one or more characters corresponding to the first language (A)  (B)

612 Receive a selection to display a second keyboard

618 Receive a selection of the third designated key to display the second keyboard 620 Display the second keyboard

622 The second keyboard and third keyboard are visually identical

624 The first keyboard is visually identical to both the second keyboard and third keyboard, but for the first designated key 626 receive a selection to display a second keyboard further comprises: receiving a selection of a dedicated keyboard switch key

---

628 Display the second keyboard on the touch-sensitive display, the second keyboard comprising:
a second set of keys corresponding to the set of characters associated with the first language; and
a second designated key displayed at the location and associated with a second function different than the first function, where the second function toggles between keyboards, including the second keyboard and a third keyboard,
wherein the second keyboard is configured such that selection of any of the second set of keys displays, in the text region, one or more characters corresponding to a second language different than the first language 630 The selection of any of the second set of keys displays, in the text region, pinyin characters corresponding to the second language of the second keyboard

902 Display the virtual keyboard comprising alphanumeric keys and a row of one or more keyboard options disposed above or below the alphanumeric keys

904 Determine that additional keyboard options are available

906 The additional keyboard options comprise affordances selected from a group consisting of: predictive text input, emoji characters, frequently used input, and formatting functions

908 The additional keyboard options provides for affordances for third party applications

910 In accordance with a determination that additional keyboard options are available, display an additional keyboard options affordance within the row

912 The additional keyboard options affordance comprises a first arrangement of dots

914 Determine if the additional keyboard options exceed the available space in the row

916 Display a further keyboard options affordance

918 The further keyboard options affordance comprises a second arrangement of dots

920 Receive a scrolling gesture at the row of one or more keyboard options

922 Cease to display the one or more keyboard options and display at least some of the additional keyboard options in the row, wherein the additional keyboard options are different than the one or more keyboard options

904 Determine that additional keyboard options are available

922 Upon detection of a selection of the additional keyboard options affordance, cease to display at least some of the one or more keyboard options and display at least some of the additional keyboard options in the row

1202 Display a first virtual keyboard comprising a first plurality of virtual keys that occupy an area of a first size, wherein the first plurality of virtual keys includes a dedicated keyboard toggle key

1204 The area of a first size and the area of a second size have at least one of height or length in common

1206 Upon detection of a selection of the dedicated keyboard toggle key, cease to display the first virtual keyboard and display a second virtual keyboard, the second virtual keyboard comprising:
a second plurality of virtual keys; and
a distinct user input area adjacent the second plurality of virtual keys, wherein the second plurality of virtual keys occupy an area of a second size less than the first size

1208 The distinct user input area is a number pad

1210 The distinct user input area is a third virtual keyboard comprising a third plurality of virtual keys corresponding to a language different from a language corresponding to the second virtual keyboard

1212 The distinct user input area is a third virtual keyboard comprising a third plurality of keys corresponding to emoji characters

1214 The distinct user input area is a drawing input area

1216 The second virtual keyboard comprises a dedicated keyboard toggle key

1218 There are fewer second plurality of virtual keys than the first plurality of virtual keys

1220 The size of each of the second plurality of virtual keys is smaller than the size of each of the first plurality of virtual keys

1502 Display a virtual keyboard on the touch-sensitive display

1504 Cease to display the virtual keyboard and display a compact virtual keyboard disposed adjacent a vertical edge of the touch-sensitive display, wherein the compact virtual keyboard is smaller than the virtual keyboard

1506 Display the compact virtual keyboard disposed adjacent the vertical edge of the touch-sensitive display comprises displaying the compact virtual keyboard at or near the vertical edge of the touch-sensitive display

1508 The compact virtual keyboard can be moved along the vertical edge of the touch-sensitive display by selecting and dragging an affordance on the compact virtual keyboard

1510 Upon detection of a flick gesture on the compact virtual keyboard on the touch-sensitive display, move the compact virtual keyboard from the vertical edge of the touch-sensitive display to an opposite vertical edge of the touch-sensitive display

1512 The flick gesture has a velocity higher than a predetermined velocity threshold

1514 Cease to display the virtual keyboard and display the compact virtual keyboard comprises animate the virtual keyboard shrinking to the compact virtual keyboard

1516 Upon detection of an expanding gesture on the compact virtual keyboard, cease to display the compact virtual keyboard and display the virtual keyboard

Figure 15

DEVICES, METHODS, AND GRAPHICAL USER INTERFACES FOR KEYBOARD INTERFACE FUNCTIONALITIES

RELATED APPLICATIONS

This application claims priority to U.S. Provisional Application Ser. No. 62/243,627, filed Oct. 19, 2015, which is incorporated by reference herein in its entirety.

TECHNICAL FIELD

This disclosure relates generally to electronic devices with touch-sensitive surfaces, including but not limited to electronic devices with touch-sensitive surfaces that provide keyboard interface functionality.

BACKGROUND

As portable electronic devices continue to evolve, and the number of functions performed by these device increases, it remains a significant challenge to achieve a user interface which allows users to easily interact with a multifunction device, especially with respect to keyboard functionality. This is particularly significant for handheld portable devices with touch-sensitive displays, where the size of the display varies yet the interface may remain similar. Some interfaces may result in complicated key sequences and menu hierarchies to achieve certain functionalities that must be memorized by the user, making accessibility and utilization of such devices difficult. In some cases when the display is too large for a user to type on the keyboard when gripping each side of the device with their hands and typing with their thumbs, the keyboard interface is not ideal for user input. As such, most conventional user interfaces are inflexible and offer a singular interface for all operations on the portable electronic device.

Accordingly, there is a need for electronic devices with faster, more efficient methods and interfaces for keyboard interface functionalities.

SUMMARY

Embodiments of the invention provide methods and interfaces that complement or replace conventional touch-screen input interfaces and methods for interfacing with them.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet generation, playing games, calling/phoning, video conferencing, e-mailing, instant messaging, fitness support, digital photography, digital videography, browsing, playing digital music, taking notes, and/or playing digital video. Executable instructions for performing these functions are, optionally, included in a non-transitory computer readable storage medium or other computer program product configured for execution by one or more processors.

In accordance with some embodiments, a method is performed at an electronic device with a touch-sensitive display. The method includes displaying a first keyboard (virtual keyboard) on the touch-sensitive display. The first keyboard comprises a first set of keys corresponding to a set of characters associated with a first language and a first designated key displayed at a location on the touch-sensitive display. The first designated key is associated with a first function. The first keyboard is configured such that selection of any of the first set of keys displays, in a text region, one or more characters corresponding to the first language. The method also includes receiving a selection to display a second keyboard. Then, in response to receiving the selection, the second keyboard is displayed on the touch-sensitive display. The second keyboard comprises a second set of keys corresponding to the set of characters associated with the first language and a second designated key displayed at the location. The second designated key is associated with a second function different from the first function. The second function toggles between keyboards, including the second keyboard and a third keyboard. The second keyboard is configured such that selection of any of the second set of keys displays, in the text region, one or more characters corresponding to a second language different from the first language.

In accordance with some embodiments, a method is performed at an electronic device with a touch-sensitive display. The method includes displaying the virtual keyboard comprising alphanumeric keys and a row of one or more keyboard options disposed above or below the alphanumeric keys. The method also includes determining whether additional keyboard options are available. Then, in accordance with a determination that additional keyboard options are available, the method includes displaying an additional keyboard options affordance within the row. Then, upon detection of a selection of the additional keyboard options affordance, the method includes ceasing to display at least some of the one or more keyboard options and displaying at least some of the additional keyboard options in the row.

In accordance with some embodiments, a method is performed at an electronic device with a display and a touch-sensitive surface. The method includes displaying a first virtual keyboard comprising a first plurality of virtual keys that occupy an area of a first size. The first plurality of virtual keys includes a dedicated multi-keyboard key. Then, upon detection of a selection of the dedicated multi-keyboard key, the method includes ceasing to display the first virtual keyboard and displaying a second virtual keyboard. The second virtual keyboard comprises a second plurality of virtual keys; and a distinct user input area adjacent the second plurality of virtual keys. The second plurality of virtual keys occupies an area of a second size less than the first size.

In accordance with some embodiments, a method is performed at an electronic device with a display and a touch-sensitive surface. The method includes displaying a virtual keyboard on the touch-sensitive display. Then, in response to detection of a gesture, the method includes ceasing to display the virtual keyboard and displaying a compact virtual keyboard disposed adjacent a vertical edge of the touch-sensitive display. The compact virtual keyboard is smaller than the virtual keyboard.

In accordance with some embodiments, an electronic device includes a touch-sensitive display unit configured to display a user interface and receive user contacts and a processing unit coupled with the touch-sensitive display unit. The processing unit is configured to enable display of a first keyboard on the touch-sensitive display. The first keyboard comprises a first set of keys corresponding to a set of characters associated with a first language and a first designated key, associated with a first function, displayed at a location on the touch-sensitive display. The first keyboard is configured such that selection of any of the first set of keys displays, in a text region, one or more characters corresponding to the first language. The processing unit is further configured to receive a selection to enable display of a second keyboard. In response to receiving the selection, the processing unit enables display of the second keyboard on the touch-sensitive display. The second keyboard comprises a second set of keys corresponding to the set of characters associated with the first language and a second designated key displayed at the location. The second designated key is associated with a second function different from the first function. The second function toggles between keyboards, including the second keyboard and a third keyboard. The second keyboard is configured such that selection of any of the second set of keys displays, in the text region, one or more characters corresponding to a second language different from the first language.

In accordance with some embodiments, an electronic device includes a touch-sensitive display unit configured to display a user interface and receive user contacts and a processing unit coupled with the touch-sensitive display unit. The processing unit is configured to enable display of a virtual keyboard comprising alphanumeric keys and a row of one or more keyboard options disposed above or below the alphanumeric keys. The processing unit is further configured to determine whether additional keyboard options are available. In accordance with a determination that additional keyboard options are available, the processing unit is further configured to enable display of an additional keyboard options affordance within the row. Upon detection of a selection of the additional keyboard options affordance, the processing unit is further configured to cease to enable display of at least some of the one or more keyboard options and enable display of at least some of the additional keyboard options in the row.

In accordance with some embodiments, an electronic device includes a touch-sensitive display unit configured to display a user interface and receive user contacts and a processing unit coupled with the touch-sensitive display unit. The processing unit is configured to: enable display of a first virtual keyboard comprising a first plurality of virtual keys that occupy an area of a first size. The first plurality of virtual keys includes a dedicated multi-keyboard key. Upon detection of a selection of the dedicated multi-keyboard key, the processing unit is further configured to cease to enable display of the first virtual keyboard and enable display of a second virtual keyboard. The second virtual keyboard comprises a second plurality of virtual keys; and a distinct user input area adjacent the second plurality of virtual keys. The second plurality of virtual keys occupies an area of a second size less than the first size.

In accordance with some embodiments, an electronic device includes a touch-sensitive display unit configured to display a user interface and receive user contacts and a processing unit coupled with the touch-sensitive display unit. The processing unit is configured to enable display of a virtual keyboard on the touch-sensitive display unit. In response to detection of a gesture, the processing unit is further configured to cease to enable display of the virtual keyboard and enable display of a compact virtual keyboard disposed adjacent a vertical edge of the touch-sensitive display unit. The compact virtual keyboard is smaller than the virtual keyboard.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Accordingly, there is a need for portable electronic devices with touch-sensitive displays that have more efficient user interfaces for keyboard input. Such interfaces allow tasks involving typing on a keyboard to be performed faster and more efficiently by users, thereby conserving power and increasing the time between battery charges in portable electronic devices. In addition, such interfaces increase the effectiveness of, and user satisfaction with, portable electronic devices. Such methods and interfaces may complement or replace conventional methods for toggling between keyboards

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6B are flow charts illustrating a method of toggling between multiple keyboards shown in FIGS. 5A-5F, in accordance with some embodiments.

FIGS. 9A-9B are flow charts illustrating a method for providing additional keyboard options for a virtual keyboard shown in FIGS. 8A-8I, in accordance with some embodiments.

FIG. 12 is a flow chart illustrating a method for selecting virtual keyboard modes shown in FIGS. 11A-11E, in accordance with some embodiments.

FIG. 15 is a flow chart illustrating a method for selecting a compact virtual keyboard shown in FIGS. 14A-14F, in accordance with some embodiments.

DESCRIPTION OF EMBODIMENTS

Figure 1A:
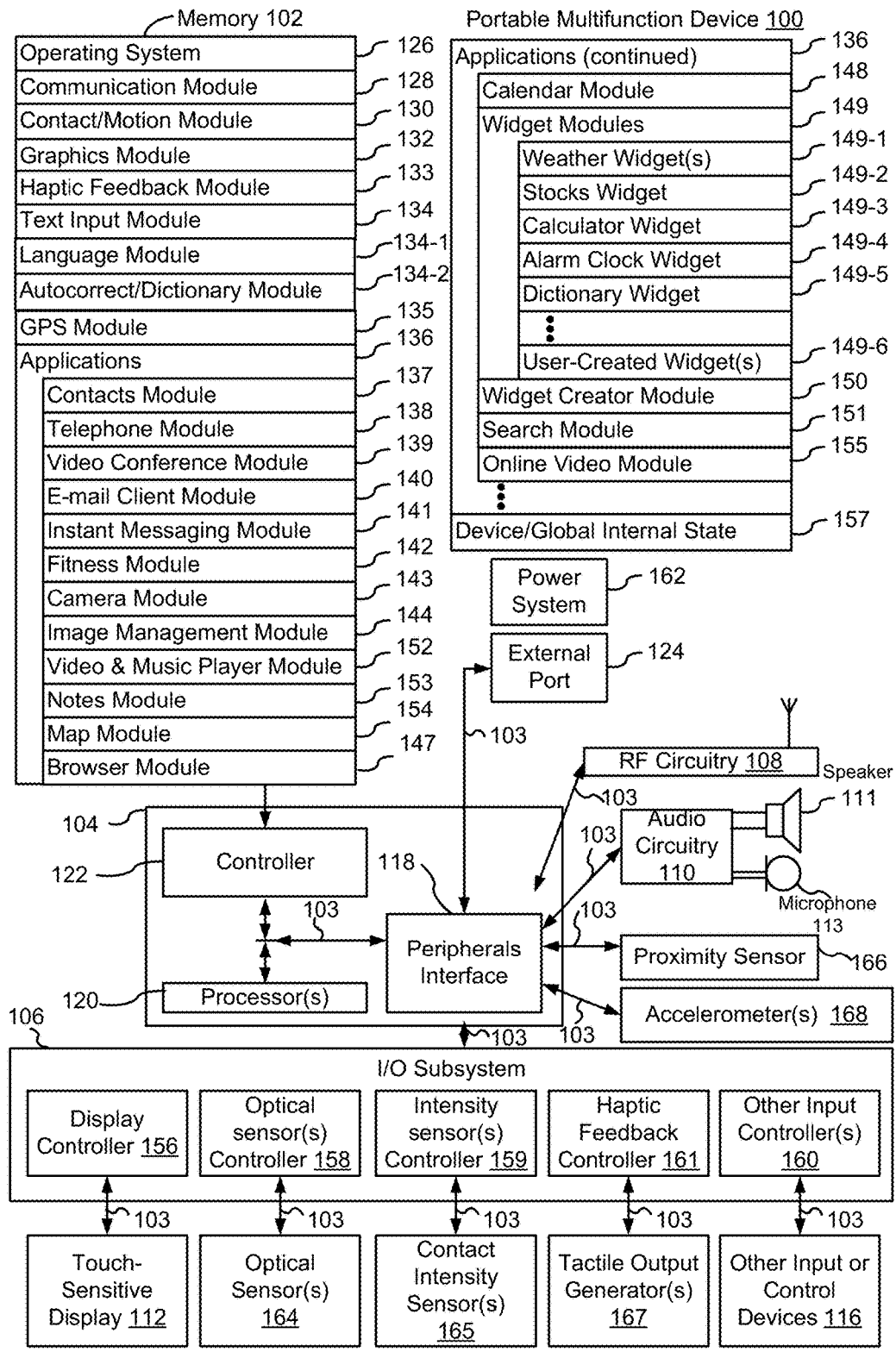
FIG. 1A is a block diagram illustrating a portable multifunction device with a touch-sensitive display, in accordance with some embodiments.

A number of different approaches for providing keyboard interface functionalities are described herein. Using one or more of these approaches (optionally in conjunction with each other) reduces the number, extent, and/or nature of the inputs from a user and provides a more efficient human-machine interface. This enables users to use keyboard interfaces with devices that have touch-sensitive surfaces faster and more efficiently. For battery-operated devices, these improvements conserve power and increase the time between battery charges. For ease of explanation, devices and methods including illustrative examples of some of these approaches are described below, as follows:

FIG. 1A illustrates a block diagram illustrating a portable multifunction device with a touch-sensitive display. Detailed memory module, device module, chip module, and I/O module block interaction is illustrated.

Figure 1B:
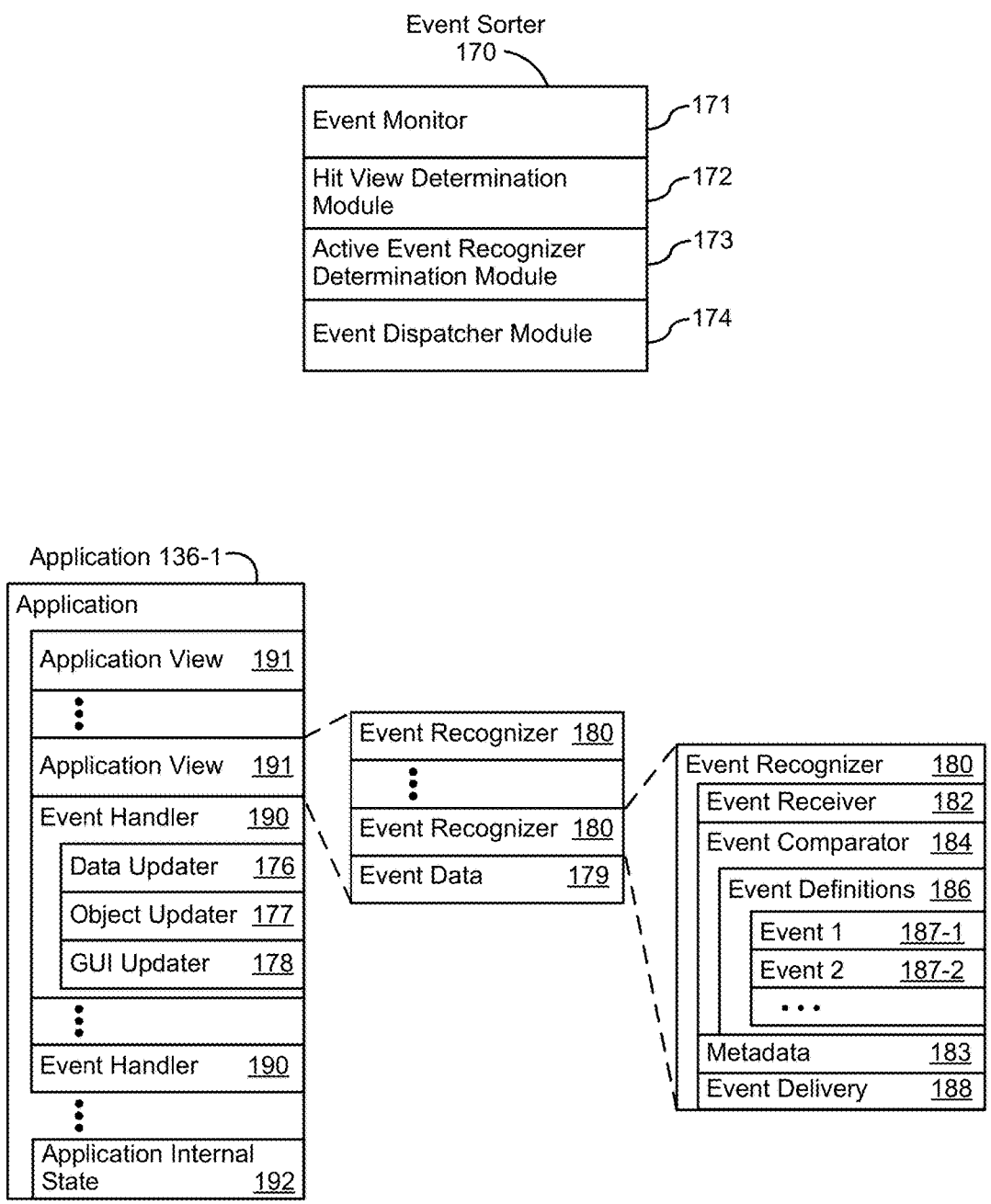
FIG. 1B is a block diagram illustrating exemplary components for event handling, in accordance with some embodiments.

FIG. 1B illustrates a block diagram illustrating exemplary components for event handling.

Figure 2:
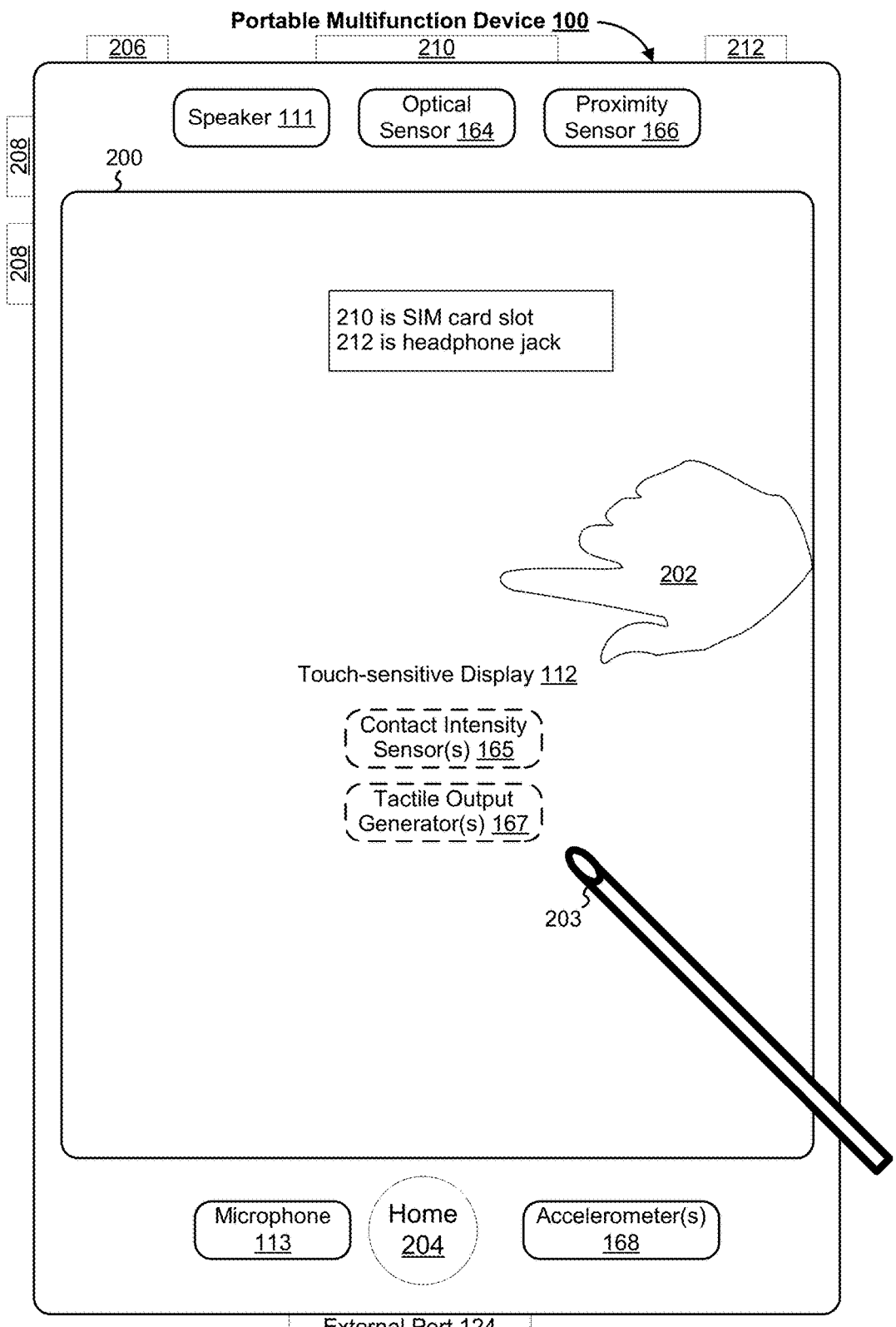
FIG. 2 illustrates a portable multifunction device having a touch screen, in accordance with some embodiments.

FIG. 2 illustrates a portable multifunction device having a touch screen, in accordance with some embodiments.

Figure 3:
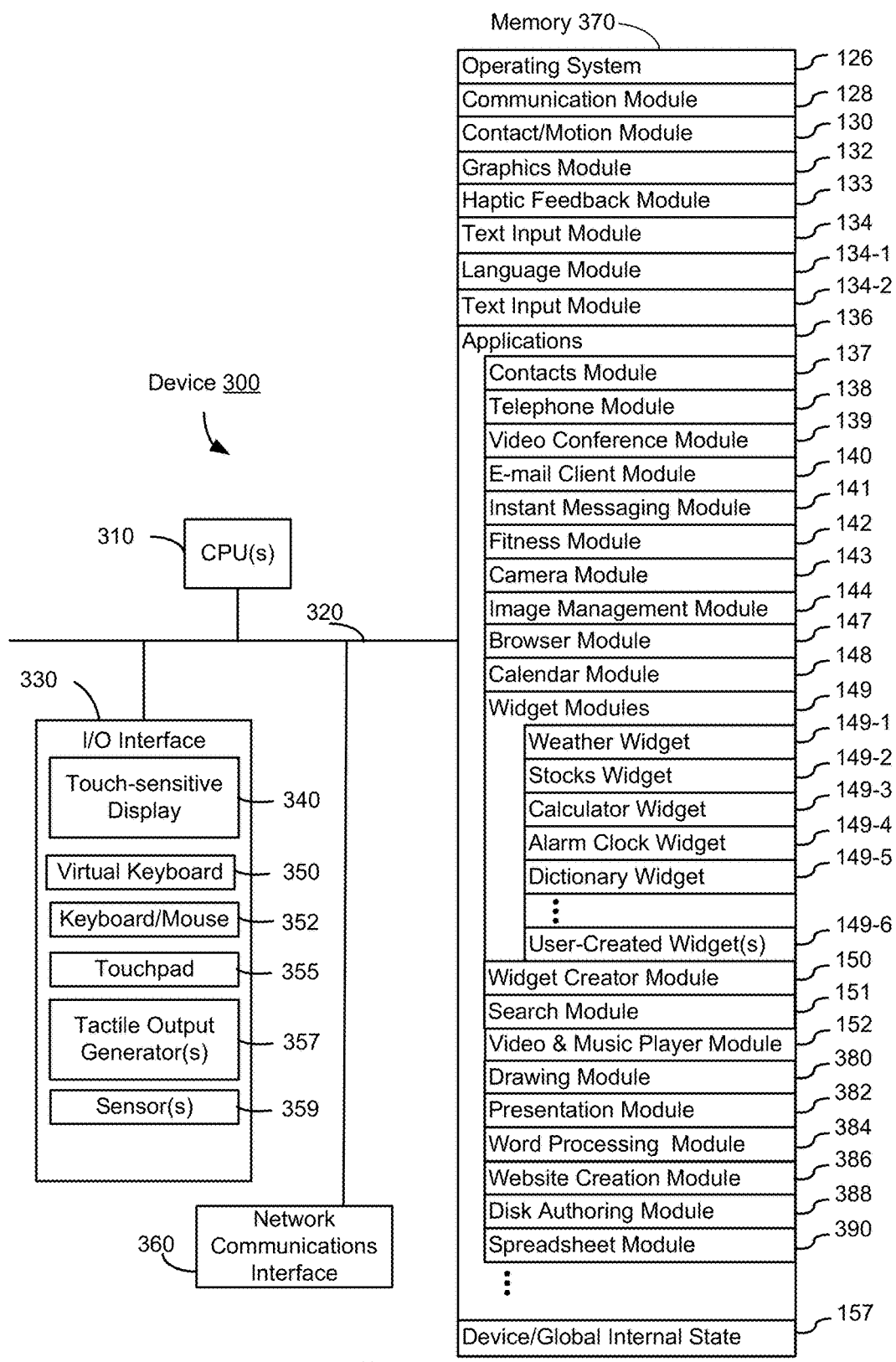
FIG. 3 is a block diagram of an exemplary multifunction device with a touch-sensitive display, in accordance with some embodiments.

FIG. 3 is a block diagram of an exemplary multifunction device with a touch-sensitive display.

Figure 4:
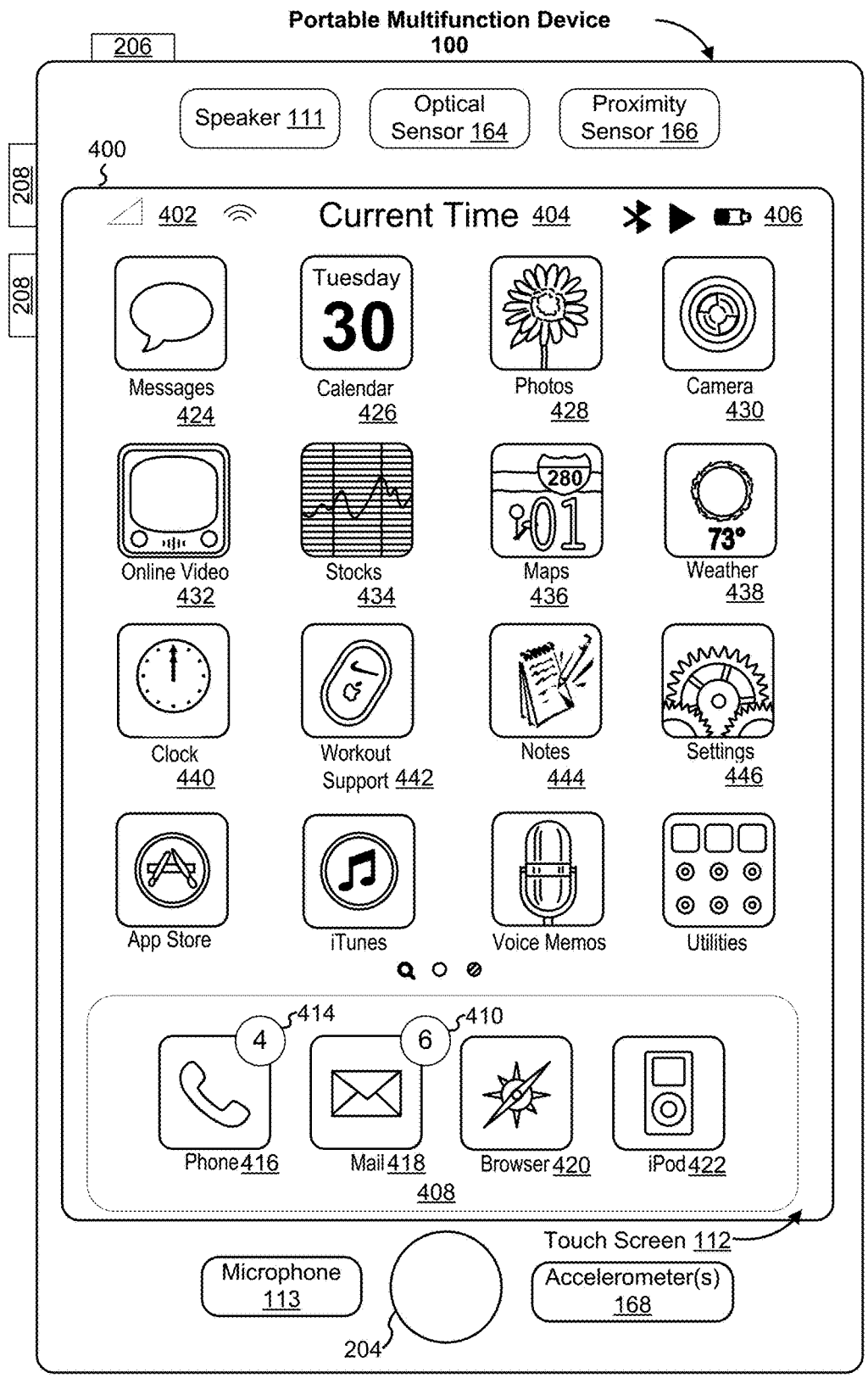
FIG. 4 illustrates an exemplary user interface for a menu of applications on a portable multifunction device, in accordance with some embodiments.

FIG. 4 illustrates an exemplary user interface for a menu of applications on a portable multifunction device.

FIGS. 5A-5F illustrate exemplary user interfaces for toggling between multiple keyboards. FIGS. 6A-6B are flow charts illustrating a method of toggling between multiple keyboards. The user interfaces in FIGS. 5A-5F are used to illustrate the processes in FIGS. 6A-6B.

FIGS. 8A-8I illustrate exemplary user interfaces for providing additional keyboard options for a virtual keyboard. FIGS. 9A-9B are flow charts illustrating a method of providing additional keyboard options for a virtual keyboard. The user interfaces in FIGS. 8A-8I are used to illustrate the processes in FIGS. 9A-9B.

FIGS. 11A-11E illustrate exemplary user interfaces for selecting virtual keyboard modes. FIG. 12 is a flow chart illustrating a method of selecting virtual keyboard modes. The user interfaces in FIGS. 11A-11E are used to illustrate the processes in FIG. 12.

FIGS. 14A-14F illustrate exemplary user interfaces for selecting a compact virtual keyboard. FIG. 15 is a flow chart illustrating a method of selecting a compact virtual keyboard. The user interfaces in FIGS. 14A-14F are used to illustrate the processes in FIG. 15.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a fitness application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display 112 in accordance with some embodiments. Touch-sensitive display 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display 112 of device 100). Device 100 optionally includes one or more tactile output generators 167 for generating tactile outputs on device 100 (e.g., generating tactile outputs on a touch-sensitive surface such as touch-sensitive display 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch-sensitive display 112. Touch-sensitive display 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, tongue, paging dots, or other user interface control.

Touch-sensitive display 112 has a touch-sensitive surface, sensor or set of sensors that accepts input from the user based on haptic and/or tactile contact. Touch-sensitive display 112 and display controller 156 (along with any associated modules and/or sets of instructions in memory 102) detect contact (and any movement or breaking of the contact) on touch-sensitive display 112 and converts the detected contact into interaction with user-interface objects (e.g., one or more soft keys, icons, web pages or images) that are displayed on touch-sensitive display 112. In an exemplary embodiment, a point of contact between touch-sensitive display 112 and the user corresponds to a finger of the user or a stylus.

Touch-sensitive display 112 optionally uses LCD (liquid crystal display) technology, LPD (light emitting polymer display) technology, or LED (light emitting diode) technology, although other display technologies are used in other embodiments. Touch-sensitive display 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display 112. In an exemplary embodiment, projected mutual capacitance sensing technology is used, such as that found in the iPhone®, iPod Touch®, and iPad® from Apple Inc. of Cupertino, Calif.

Touch-sensitive display 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input). Language module 134-1, which is, optionally, a component of text input module 134, provides for a language to be associated with keystroke selection from a keyboard. The module may include and manage multiple languages. Autocorrect/Dictionary module 134-2, which is, optionally a component of the language module 134-1, provides for a dictionary is association with the selected language. The Autocorrect/Dictionary module 134-2 may also be configured to provide an autocorrect functionality with the selected language.

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
fitness module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;

video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display 112, display controller 156, contact module 130, graphics module 132, text input module 134, language module 134-1, and autocorrect/dictionary module 134-2, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display 112, display controller 156, contact module 130, graphics module 132, text input module 134, language module 134-1, and autocorrect/dictionary module 134-2, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display 112, display controller 156, contact module 130, graphics module 132, text input module 134, GPS module 135, map module 154, and music player module 146, fitness module 142 includes executable instructions to create fitness plans (e.g., with time, distance, and/or calorie burning goals); communicate with fitness sensors (in sports devices and smart watches); receive fitness sensor data; calibrate sensors used to monitor a fitness plan; select and play music for or during a fitness plan; and display, store and transmit fitness data.

In conjunction with touch-sensitive display 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display 112, display system controller 156, contact module 130, graphics module 132, text input module 134, language module 134-1, and autocorrect/dictionary module 134-2, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display 112, display system controller 156, contact module 130, graphics module 132, text input module 134, language module 134-1, autocorrect/dictionary module 134-2, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display 112, display system controller 156, contact module 130, graphics module 132, text input module 134, language module 134-1, and autocorrect/dictionary module 134-2, search module 151 includes executable instructions to search for text, music, sound, image, video, and/or other files in memory 102 that match one or more search criteria (e.g., one or more user-specified search terms) in accordance with user instructions.

In conjunction with touch-sensitive display 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display 112, or on an external display connected wirelessly or via external port 124). In some embodiments, device 100 optionally includes the functionality of an MP3 player, such as an iPod (trademark of Apple Inc.).

In conjunction with touch-sensitive display 112, display controller 156, contact module 130, graphics module 132, text input module 134, language module 134-1, and autocorrect/dictionary module 134-2, notes module 153 includes executable instructions to create and manage notes, to do lists, and the like in accordance with user instructions.

In conjunction with RF circuitry 108, touch-sensitive display 112, display system controller 156, contact module 130, graphics module 132, text input module 134, language module 134-1, autocorrect/dictionary module 134-2, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display 112, display system controller 156, contact module 130, graphics module 132, audio circuitry 110, speaker 111, RF circuitry 108, text input module 134, language module 134-1, autocorrect/dictionary module 134-2, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display 112, FIG. 1A) in accordance with some embodiments. The touch screen optionally displays one or more graphics within user interface (UI) 200. In this embodiment, as well as others described herein, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising a touch-sensitive display 340. I/O interface 330 also includes a virtual keyboard 350. I/O interface 330 also optionally includes, a mouse (or other pointing device 352), and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4 illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:
- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Map;"
- Icon 438 for weather widget 149-1, labeled "Weather;"
- Icon 440 for alarm clock widget 149-4, labeled "Clock;"
- Icon 442 for fitness module 142, labeled "Fitness Support;"
- Icon 444 for notes module 153, labeled "Notes;" and
- Icon 446 for a settings application or module, which provides access to settings for device 100 and its various applications 136.

It should be noted that the icon labels illustrated in FIG. 4 are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3) while the cursor is over a particular user interface element (e.g., a button, window, slider or other user interface element), the particular user interface element is adjusted in accordance with the detected input. In some implementations that include a touch-screen display (e.g., touch-sensitive display 112 in FIG. 1A or the touch screen in FIG. 4) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

Toggling between Multiple Keyboards

FIGS. 5A-5F illustrate exemplary user interfaces for toggling between multiple keyboards in accordance with some embodiments. The user interfaces in these figures are used to illustrate the processes described below, including the processes in FIGS. 6A-6B. For convenience of explanation, some of the embodiments will be discussed with reference to operations performed on a device with a touch-sensitive display 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display 112.

Figure 5A:
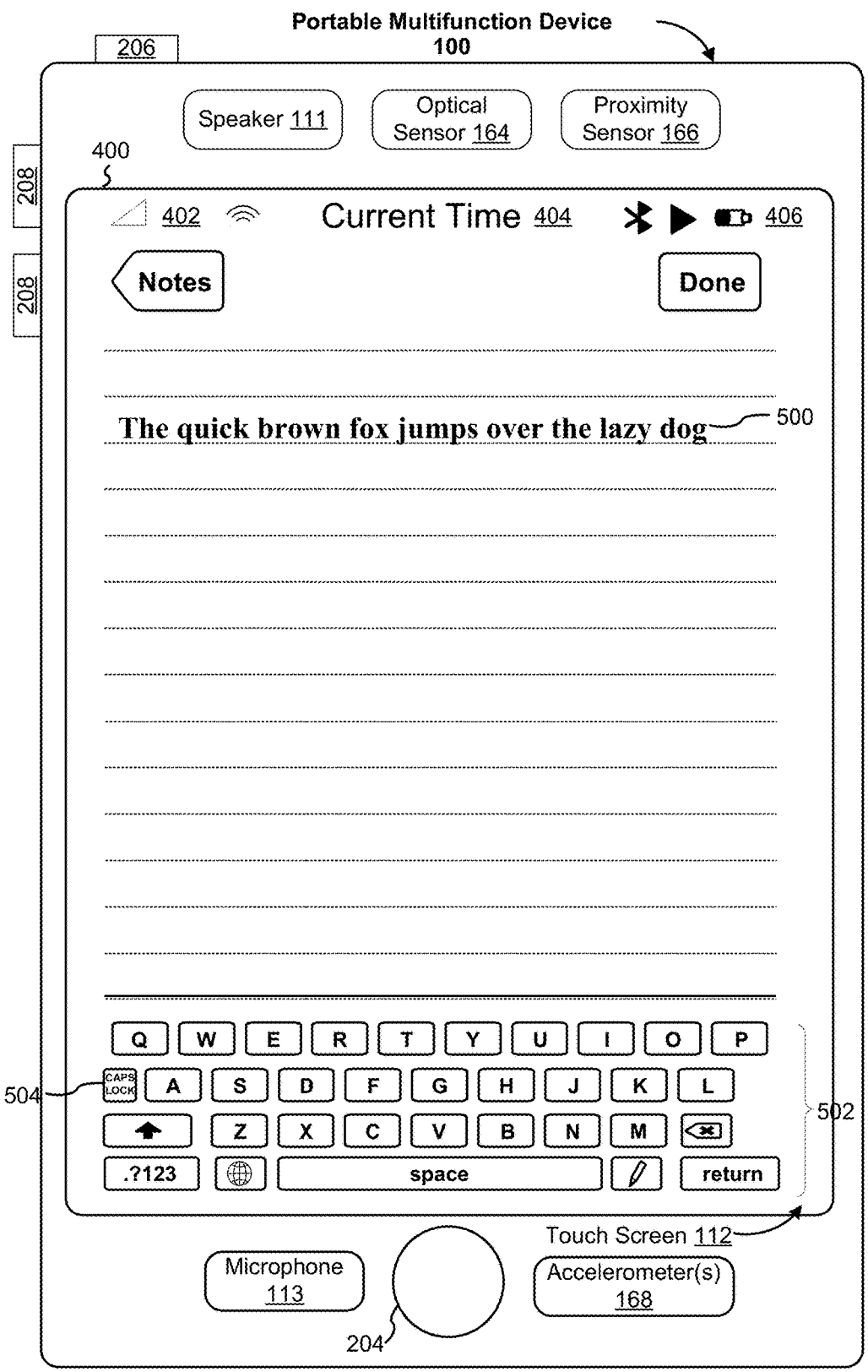
FIGS. 5A-5F illustrate exemplary user interfaces for toggling between multiple keyboards, in accordance with some embodiments.

FIG. 5A illustrates an embodiment where characters are displayed in a text region in response to character/key selection of a first keyboard 502 with virtual keys displaying Roman characters in association with a first language (e.g., English). In this embodiment, the keyboard is a virtual keyboard displayed on a graphical user interface of a Notes Application. The user selects a text region of the Notes Application which allows for user keystroke input. Upon user selection of a text region, the selection of virtual keys displays the characters 500 in the text region.

The first keyboard also includes a first designated key 504. For example, the first designated key can be a caps-lock key. In some embodiments, the first designated key is a pre-determined alphanumeric key. In some embodiments, the first designated key is user selectable, e.g., the user can assign a specific key as the first designated key.

Figure 5B:
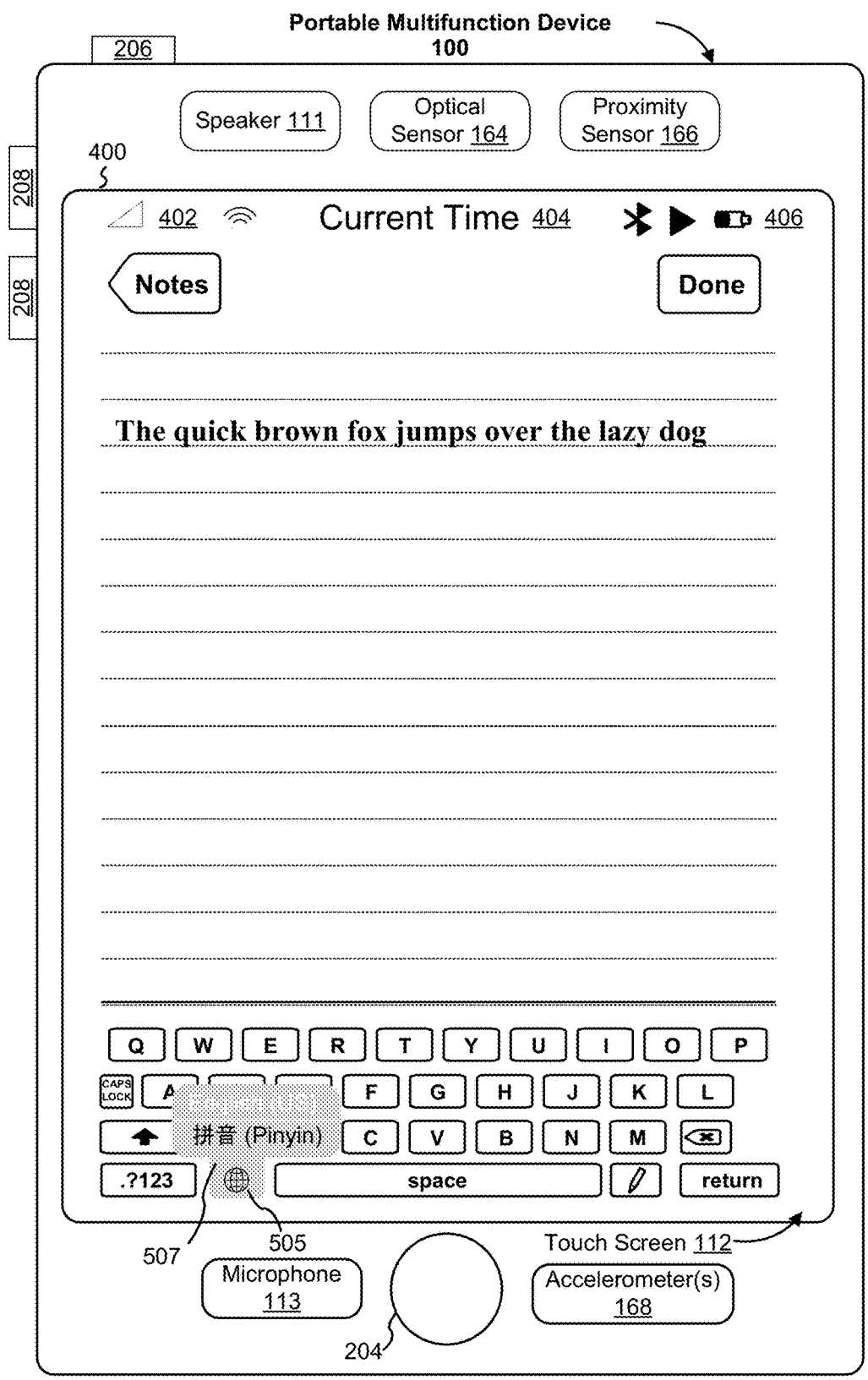

FIG. 5B illustrates an embodiment where the user selects a second keyboard by selecting a dedicated keyboard switch key. In some embodiments, the dedicated keyboard switch key is denoted by a globe icon. For example, FIG. 5A displays the globe icon 505 as the dedicated keyboard switch key. Here, after the selection of the globe icon, the sub-menu 507 is displayed offering keyboard selection options by the user. The submenu shows the available keyboards for selection, including the keyboard currently selected. In this example, the user selects the Pinyin keyboard as a second keyboard from the sub-menu.

Figure 5C:
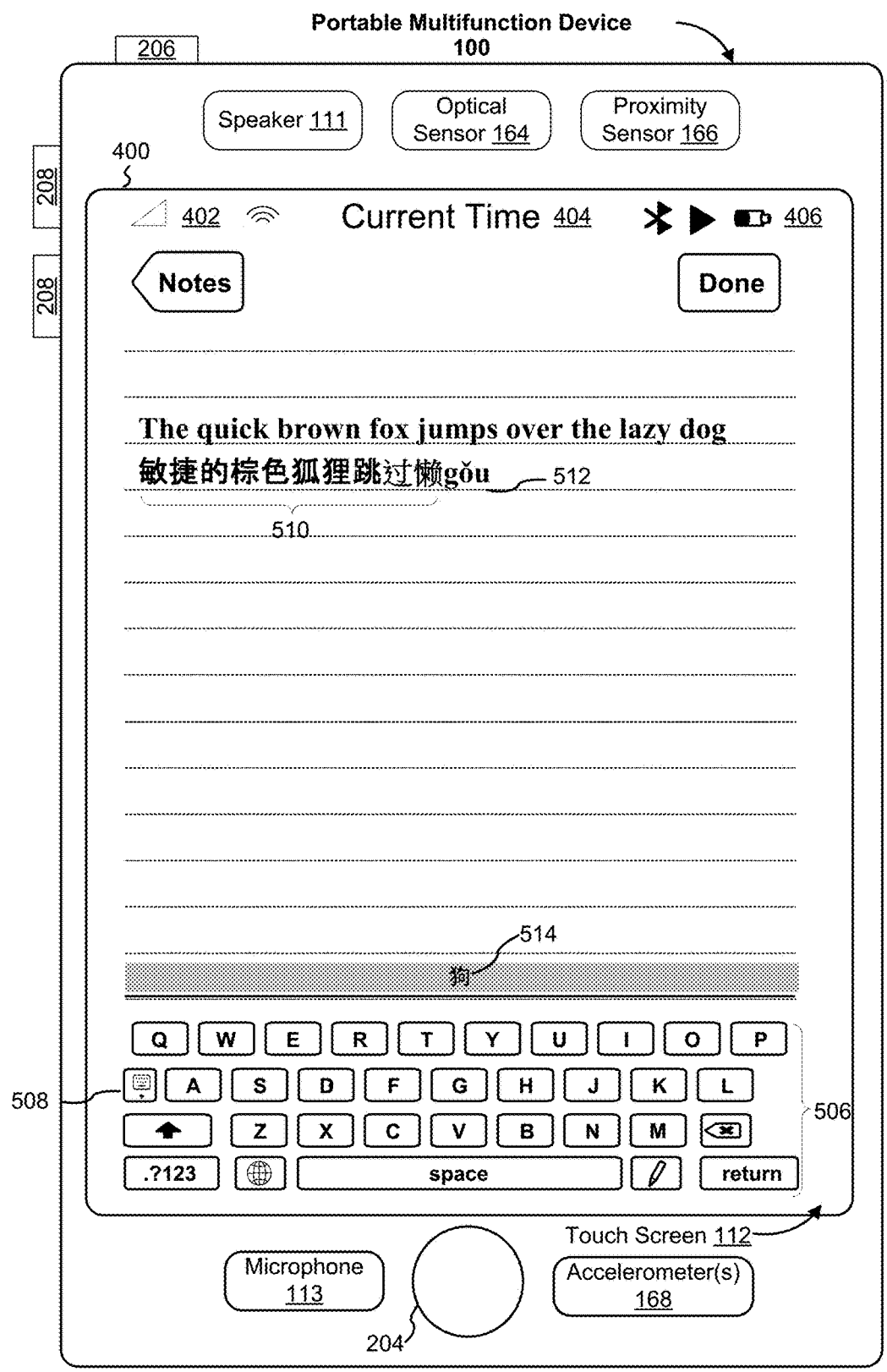

FIG. 5C illustrates an embodiment where a second keyboard comprises a second set of keys corresponding with characters of a first language, however the characters output are of a different second language. In this example, Chinese characters are displayed in a text region in response to character selection from a Pinyin keyboard (Roman English characters). Pinyin functions as a Romanization system allowing for Chinese words to be phonetically written in English. The current embodiment provides for a Pinyin keyboard to utilize Roman characters for the set of keys of the keyboard. Users may type Romanized English characters to phonetically spell Chinese language words. Each Roman character, or a sequence of Roman characters, is associated with Chinese character(s). When the word is completed, the Romanized English characters are automatically converted into the corresponding simplified Chinese character(s). As shown in this example, the Pinyin keyboard is selected as the second keyboard. The second keyboard has a first set of keys (in Roman script) corresponding to a set of characters associated with a second language; which in this example is Pinyin. The user then makes selection of Romanized English characters to phonetically spell a Chinese word. The Romanized English characters 512 are output in a text region of the Notes Application. Previous words typed by the user in Pinyin have been automatically converted into simplified Chinese 510 upon the completion of spelling of each respective Chinese word phonetically in English. In some embodiments a suggested Chinese word will display in a row 514 disposed above the alphanumeric keys of the keyboard based on a Pinyin language dictionary and autocorrect function.

In this example, the second keyboard contains a second designated key 508, denoted with a keyboard icon. In some embodiments, the designated key for the second keyboard and the designated key for the first keyboard share the same location.

Figure 5D:
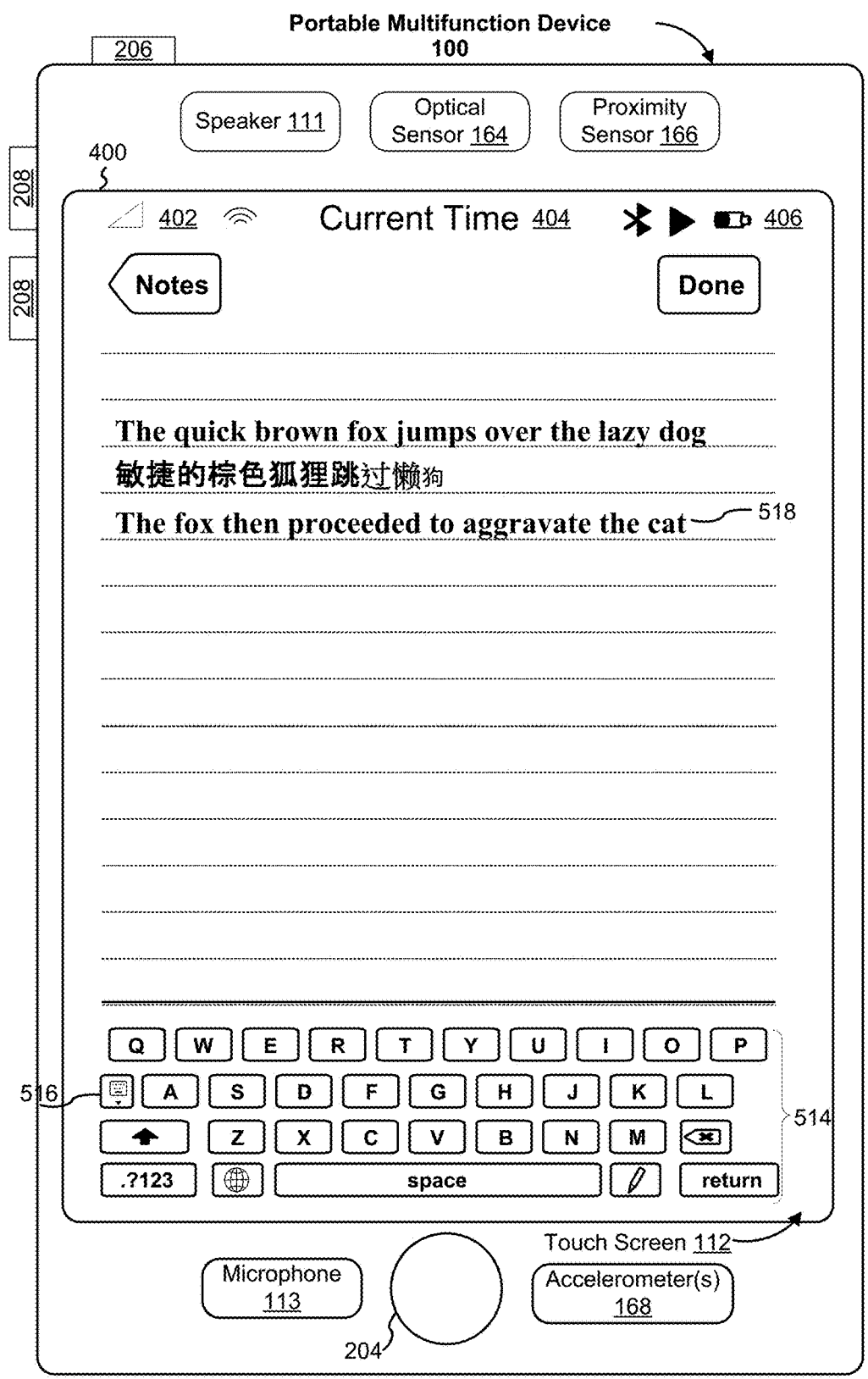

FIG. 5D illustrates an embodiment where characters of a first language 518 are displayed in a text region in response to character selection from a third keyboard 514. The third keyboard has a first set of keys (e.g., Roman script) corresponding to a set of characters associated with a first language (e.g., English). As shown in this example, the language was switched between the second keyboard (FIG. 5C) and the third keyboard (FIG. 5D) by selection of the second designated key of the second keyboard, previously shown in FIG. 5C (508). The second designated key toggles between the second keyboard and the third keyboard. In similar fashion to the second designated key, the third designated key 516 on the third keyboard provides for toggling between the third keyboard and the second keyboard. In this example, the first, second, and third designated keys for their respective keyboards all share the same location. This toggle functionality provides for quicker switching between keyboards utilizing different respective languages and keyboards that are used in conjunction with each other.

Figure 5E:
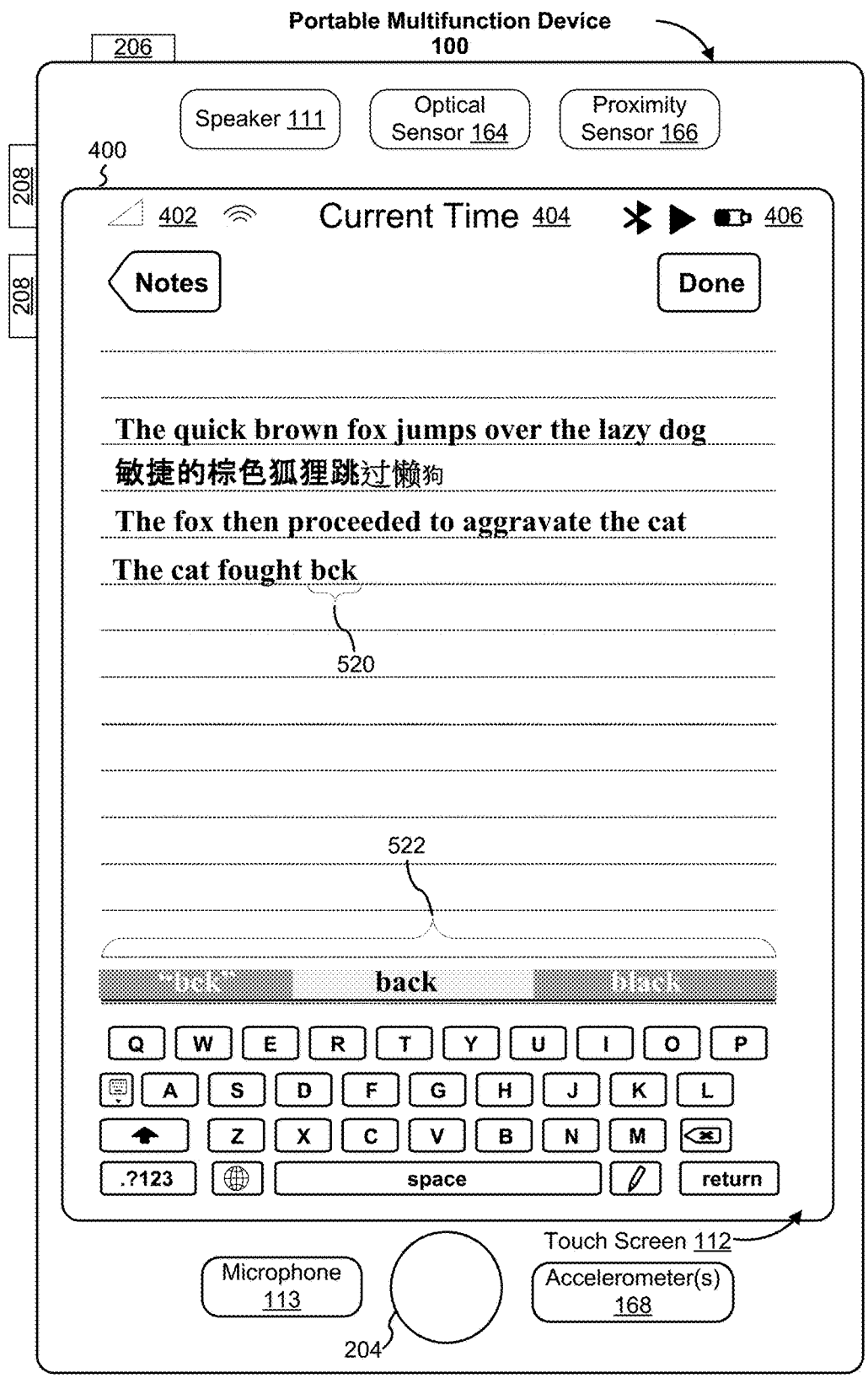

FIG. 5E illustrates an example of a respective autocorrect dictionary being associated with a corresponding language for the applicable keyboard. In this example, the third keyboard is associated with the first language 134-1, FIG. 3 (e.g., English) and thus the autocorrect dictionary for that language is used to suggest words in that language 134-2, FIG. 3 (e.g., English words). In this example, the text selection "bck" 520 does not match a recognized word in the associated English dictionary. Thus, the autocorrect dictionary provides a number of options 522 to remedy the text selection "bck". In some embodiments, the options are generated from predictive text algorithms associated with the autocorrect dictionary.

Figure 5F:
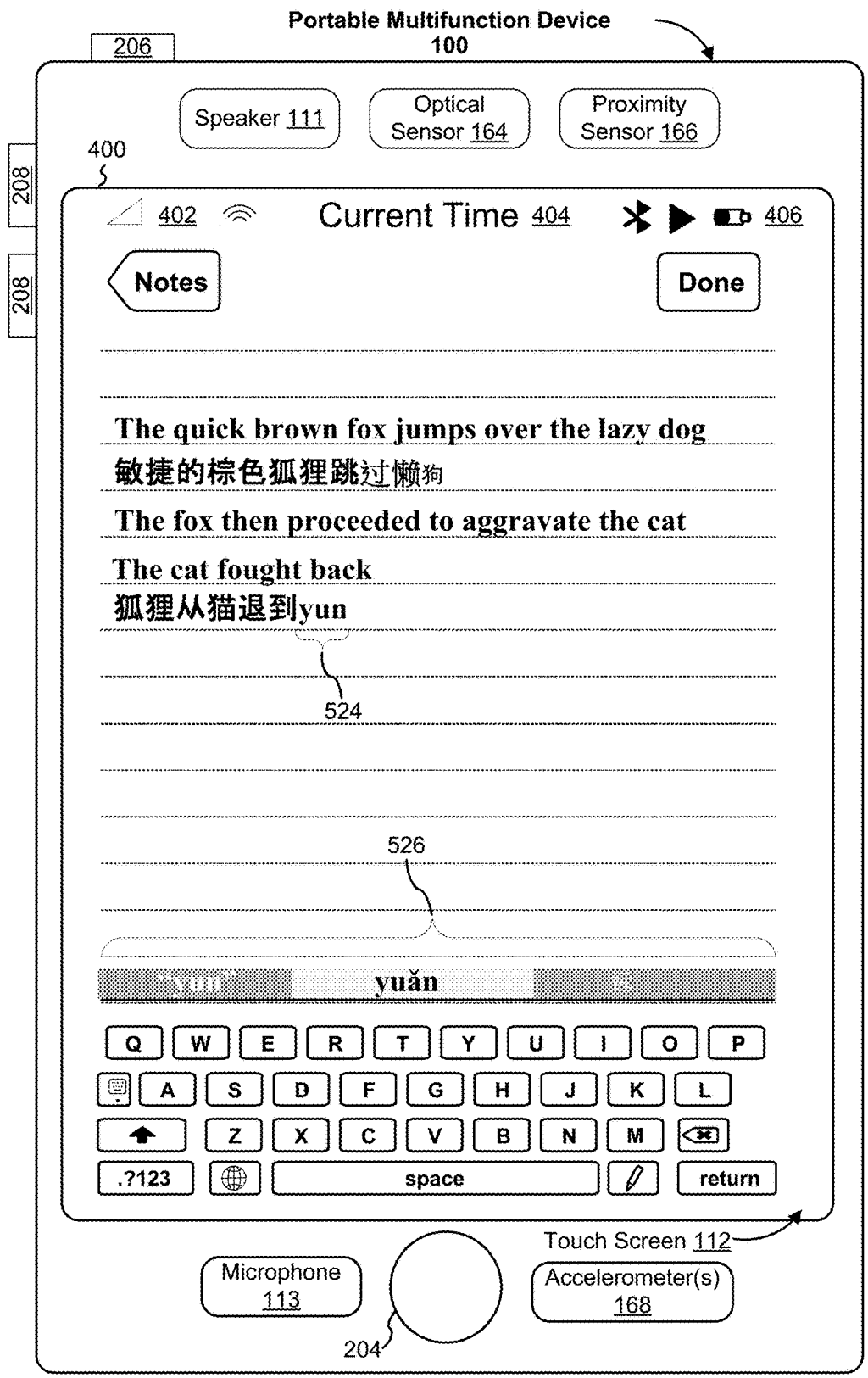

FIG. 5F illustrates another example of a respective autocorrect dictionary being associated with a corresponding language for the applicable keyboard. In this example, the second keyboard is associated with the second language 134-1, FIG. 3 (e.g., Pinyin) and thus the autocorrect dictionary for that language is used to suggest words in that language 134-2, FIG. 3 (e.g., Pinyin). In this example, the text selection "yun" 524 does not match a recognized word in the associated Pinyin dictionary. Thus, the autocorrect dictionary provides a number of options 526 to correct the text selection "yun". The options may be in both Pinyin and/or simplified Chinese characters. In some embodiments, the options are generated from predictive text algorithms associated with the autocorrect dictionary.

FIGS. 6A-6B are flow charts illustrating a method 600 of toggling between multiple keyboards in accordance with some embodiments. The method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display 112, FIG. 1A).

As described below, the method 600 provides an easy way of toggling between multiple keyboards that are often—used together, e.g., English and Pinyin keyboards.

The device displays (602) a first keyboard on the touch-sensitive display, the first keyboard having a first set of keys corresponding to a set of characters associated with a first language. The device also displays a first designated key displayed at a location on the touch-sensitive display, the first designated key associated with a first function. The first keyboard is configured such that selection of any of the first set of keys displays, in a text region, one or more characters corresponding to the first language. FIG. 5A, for example, shows a first keyboard 502 where selection of the first set of keys corresponding to a set of Roman characters output text in the text region 500 in a first language which is English. In this example, the first designated key is the caps-lock key. The first designated key is associated with a first function. In some embodiments, the first designated key, the caps-lock key in this example, provides uppercase characters to any character selection performed subsequent to the caps-lock key being selected.

In some embodiments, any of the first, second, and third designated keys is any one of a caps-lock, shift, or formatting function key of the selected respective keyboard (604). It may be desirable to have the designated key set as caps-lock or shift in certain languages as some languages do not utilize uppercase letters (e.g., Pinyin). In FIG. 5A, for example, the first designated key is the caps-lock key.

In some embodiments, selection of any of the first, second, and third designated keys is enabled by a single tap selection on the touch-sensitive display (606). In some embodiments, the selection of the designated key may be assigned a predefined tap selection for single tap, a press, or a hold on the designated key area. In some embodiments, a press of high intensity or force on the respective second or third designated key provides for toggling the keyboard selection to the first keyboard.

In some embodiments, the first and second set of keys utilizes Roman script (608). In FIGS. 5A and 5C, the first set of keys of the first keyboard 502 corresponds to Roman character script in association with a first language (e.g., English). The second set of keys of the second keyboard 502 corresponds to Roman character script in association with a second language (e.g., Pinyin). Each Roman character, or a sequence of characters, is associated with a Chinese character that is displayed. When the word is completed, the Romanized English characters are automatically converted into simplified Chinese characters. For example, FIG. 5C displays the Romanized character selection of "gǒu". This character selection is converted simplified Chinese character upon the completion of spelling of the respective Chinese word phonetically in English. For example, FIG. 5D illustrates that "gǒu" is replaced with the corresponding Chinese character.

In some embodiments, the first language is associated with a first autocorrect dictionary, and the second language is associated with a second autocorrect dictionary (610). For example, FIG. 5E illustrates an autocorrect dictionary used with English where suggestions are provided in a row above the character keys as well as an option to keep the unrecognized character string. In a similar fashion, the example of FIG. 5F illustrates an autocorrect dictionary used with Pinyin. In some embodiments, the autocorrect dictionary provides for suggestions only. In some embodiments, the autocorrect dictionary automatically corrects the selected character string based on predetermined autocorrect rules.

Next, the device receives a selection to display a second keyboard (612) by the user selecting a keyboard selection key (e.g., the globe key). In some embodiments, receiving a selection to display a second keyboard further comprises receiving a selection of a dedicated keyboard switch key (626). For example, FIG. 5B illustrates the user selecting the second keyboard by selecting a dedicated keyboard switch key (e.g., key denoted by a globe icon 505). The second keyboard has a second set of keys (in Roman script) corresponding to a set of characters associated with a second language (e.g., Pinyin). Subsequent to the selection of the globe key, a sub-menu allows for the selection of the second keyboard 505-1. Alternatively, the user taps the keyboard selection key to serially select the next available keyboard.

In some embodiments, the device receives a selection of the second designated key to display the third keyboard (614). For example, in FIG. 5C, the second designated key is denoted 508 as the keyboard toggle key. The selection of the keyboard toggle key in this example toggles from the second keyboard to the third keyboard.

In some embodiments, the device displays the third keyboard, the third keyboard having a third set of keys corresponding to the set of characters associated with the first language. The device also displays a third designated key disposed at the location, wherein the third designated key is the same as the second designated key (e.g., the third designated key 518, FIG. 5D is at the same location as the second designated key 508, FIG. 5C). The third keyboard is configured such that selection of any of the set of keys displays, in the text region, one or more characters corresponding to the first language (616). For example, in FIG. 5D, the third keyboard 514 is selected which displays the set of keys displaying characters 518 of the first language, English. The third designated key is denoted 518. In some embodiments, the device receives a selection of the third designated key to display the second keyboard (618). In response, the device then displays the second keyboard (620).

In some embodiments, the second keyboard and third keyboard are visually identical (622). For example, in FIGS. 5C and 5D, the second and third keyboards respectively are shown to be identical with the same location for the respective designated keys.

In some embodiments, the first keyboard is visually identical to both the second keyboard and third keyboard, but for the first designated key (624). For example, in FIGS. 5C and 5D, the second and third keyboards respectively are shown to be identical with the same location of the designated key. The first keyboard, although uses the caps-lock key as the designated key, the function of the first designated key is associated with a first function (e.g., producing uppercase characters, performing other programmed functions). In some embodiments, the first designated key is visually distinct from the second and third designated keys. For example, the first designated key 504 in FIG. 5A is displayed as a "caps-lock" key. However, the second designated key 508 and third designated key 516 in FIGS. 5A and 5C respectively are displayed as keyboard icons.

Next, the device displays the second keyboard on the touch-sensitive display, the second keyboard having a second set of keys corresponding to the set of characters associated with the first language. The device also displays a second designated key displayed at the location and associated with a second function different than the first function, where the second function toggles between keyboards, including the second keyboard and a third keyboard. For example, the first function of the first designated key 504 in FIG. 5A is caps-lock, whereas the second function of the second designated key 508 in FIG. 5C is keyboard toggle. The second keyboard is configured such that selection of any of the second set of keys displays, in the text region, one or more characters corresponding to a second language different than the first language (628). For example, FIG. 5C illustrates the second keyboard 506 with second designated key 508 which functions to toggle between the second and third keyboard.

In some embodiments, the selection of any of the second set of keys displays, in the text region, Pinyin characters corresponding to the second language of the second keyboard (630). For example, in FIG. 5C, the selection of the second set of keys on the second keyboard 506 displays Pinyin characters 512.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 900, 1200, 1500 are also applicable in an analogous manner to method 600 described above with respect to FIGS. 6A-6B. For brevity, these details are not repeated here.

Figure 7:
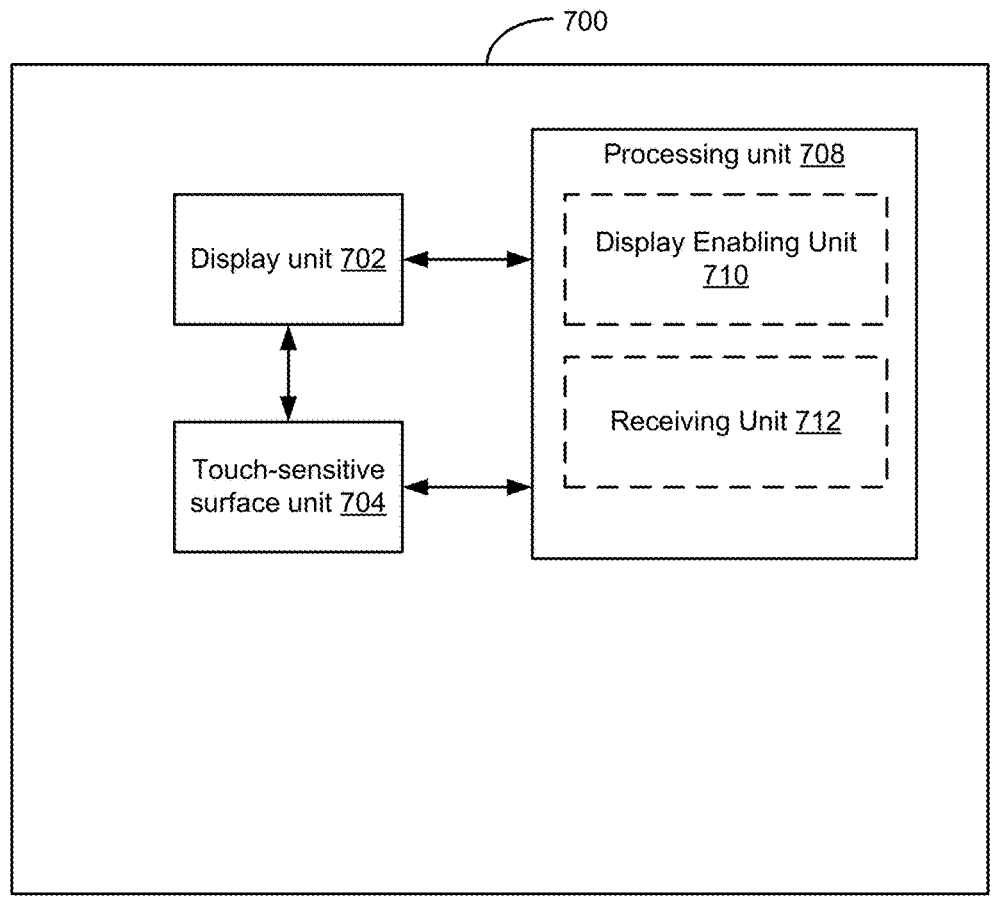
FIG. 7 is a functional block diagram of an electronic device illustrating the modules for toggling between multiple keyboards, in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display a user interface, a touch-sensitive surface unit 704 configured to receive contacts and a processing unit 708 coupled with the display unit 702 and the touch-sensitive surface unit 704. In some embodiments, the processing unit 708 includes: a display enabling unit 710, and a receiving unit 712.

The processing unit 708 is configured to enable display of a first keyboard on the touch-sensitive display (e.g., with the display enabling unit 710), the first keyboard having a first set of keys corresponding to a set of characters associated with a first language. The first keyboard also having a first designated key displayed at a location on the touch-sensitive display, the first designated key associated with a first function. The first keyboard is configured such that selection of any of the first set of keys displays, in a text region, one or more characters corresponding to the first language. The processing unit is further configured to receive a selection to enable display of a second keyboard (e.g., with the receiving unit 712). In response to receiving the selection, the processing unit is further configured to enable display of the second keyboard on the touch-sensitive display (e.g., with the display enabling unit 710). The second keyboard comprises a second set of keys corresponding to the set of characters associated with the first language. The second keyboard also comprises a second designated key displayed at the location and associated with a second function different than the first function, where the second function toggles between keyboards, including the second keyboard and a third keyboard. The second keyboard is configured such that selection of any of the second set of keys displays, in the text region, one or more characters corresponding to a second language different than the first language.

In some embodiments, the processing unit 708 is further configured to receive a selection of the second designated key to display the third keyboard (e.g., with the receiving unit 712). Then, in response to receiving the selection, enable display of the third keyboard (e.g., with the display enabling unit 710). The third keyboard comprises a third set of keys corresponding to the set of characters associated with the first language and a third designated key disposed at the location. The third designated key is the same as the second designated key, wherein the third keyboard is configured such that selection of any of the set of keys displays, in the text region, one or more characters corresponding to the first language.

In some embodiments, the processing unit 708 is further configured to receive a selection of the third designated key to display the second keyboard (e.g., with the receiving unit 712). Then, in response to receiving the selection, enable display of the second keyboard (e.g., with the display enabling unit 710).

In some embodiments, any of the first, second, and third designated keys is any one of a Caps Lock, shift, or formatting function key of the selected respective keyboard on the touch-sensitive display 704.

In some embodiments, the selection of any of the first, second, and third designated keys is enabled by a single tap selection on the touch-sensitive display 704.

In some embodiments, the second keyboard and third keyboard are visually identical on the touch-sensitive display 704.

In some embodiments, the first keyboard is visually identical to both the second keyboard and third keyboard, but for the first designated key on the touch-sensitive display 704.

In some embodiments, wherein the first language is associated with a first autocorrect dictionary, and the second language is associated with a second autocorrect dictionary on the touch-sensitive display 704.

In some embodiments, the first and second set of keys utilizes Roman script on the touch-sensitive display 704.

In some embodiments, receiving a selection to display a second keyboard causes the processing unit 708 to be further configured to: receive a selection of a dedicated keyboard switch key (e.g., with the receiving unit 712).

In some embodiments, selection of any of the second set of keys displays, in the text region, Pinyin characters corresponding to the second language of the second keyboard on the touch-sensitive display 704.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6B, optionally, implemented by components depicted in FIGS. 1A-1B or FIG. 7. For example, display operation 602, receive operation 612, display operation 628 are, optionally, implemented by display enabling unit 710, receiving unit 712, and display enabling unit 710. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Additional Keyboard Options

FIGS. 8A-8I illustrate exemplary user interfaces for providing additional keyboard options in accordance with some embodiments. The user interfaces in these figures are used to illustrate the processes described below, including the processes in FIGS. 9A-9B. For convenience of explanation, some of the embodiments will be discussed with reference to operations performed on a device with a touch-sensitive display 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display 112.

Figure 8A:
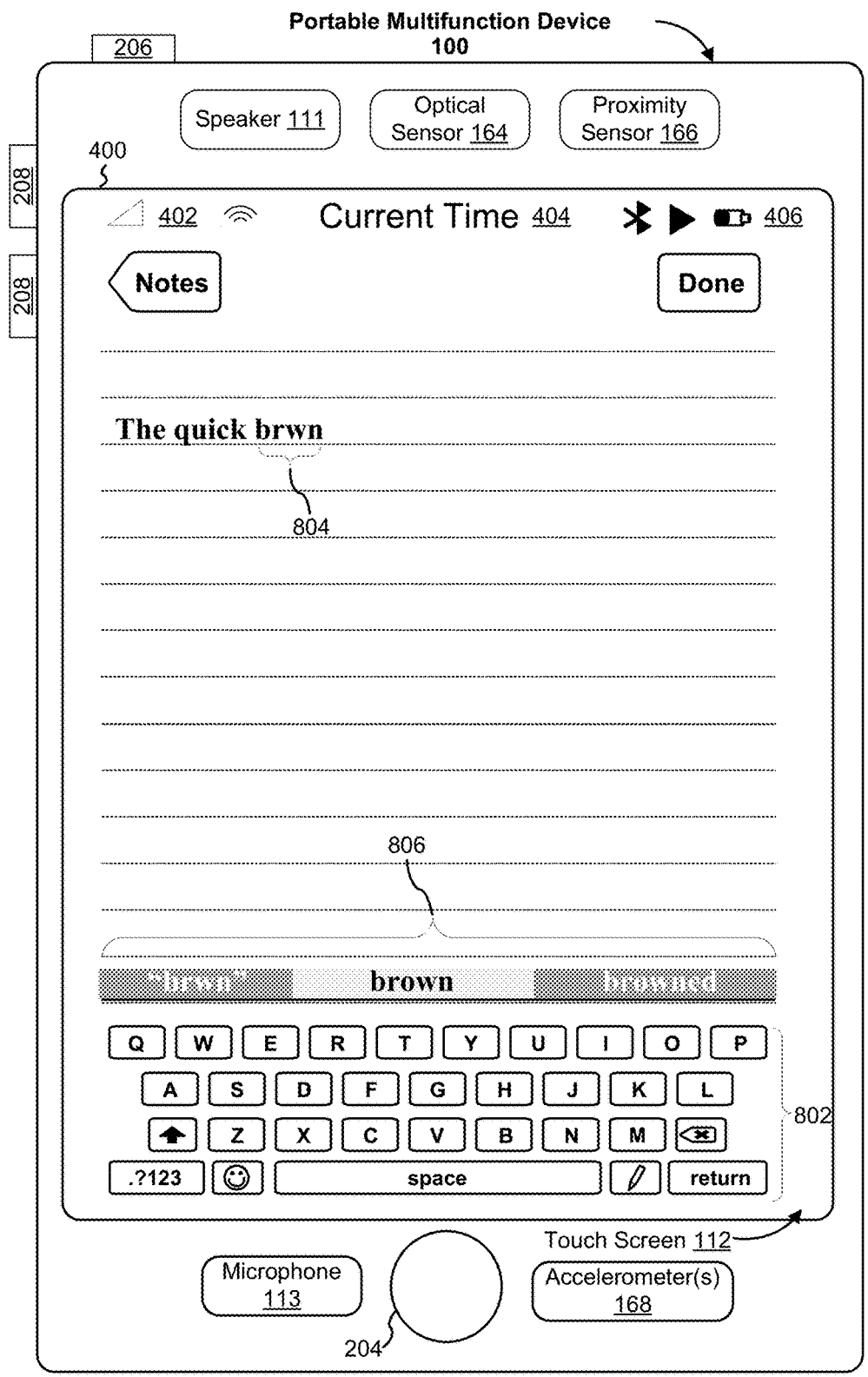
FIGS. 8A-8I illustrate exemplary user interfaces for providing additional keyboard options for a virtual keyboard in accordance with some embodiments.

FIG. 8A illustrates an embodiment where a row of keyboard options 806 corresponding to a selection of characters 804 made on a virtual keyboard 802. The row provides for additional keyboard options which include, but are not limited to formatting options, emoji characters, and predictive text. In this example, the character selection made was "brwn" which resulted in the displaying of three options in the row of keyboard options presented above the alphanumeric keys. All the three options can fit within the row of keyboard options; thus in this example there is no affordance provided which provides for additional keyboard options. In some embodiments, keyboard options are functions for interacting with third party applications. In some embodiments, keyboard options are based on user preferences and behavior. In some embodiments, one or more additional keyboard options remain selectable for every character selection (e.g., the option is permanently displayed irrespective of character selection). In some embodiments, the row is disposed above the alphanumeric keys. In some embodiments, In some embodiments, the row is disposed below the alphanumeric keys. In some embodiments, the row is disposed to an adjacent side of the alphanumeric keys.

Figure 8B:
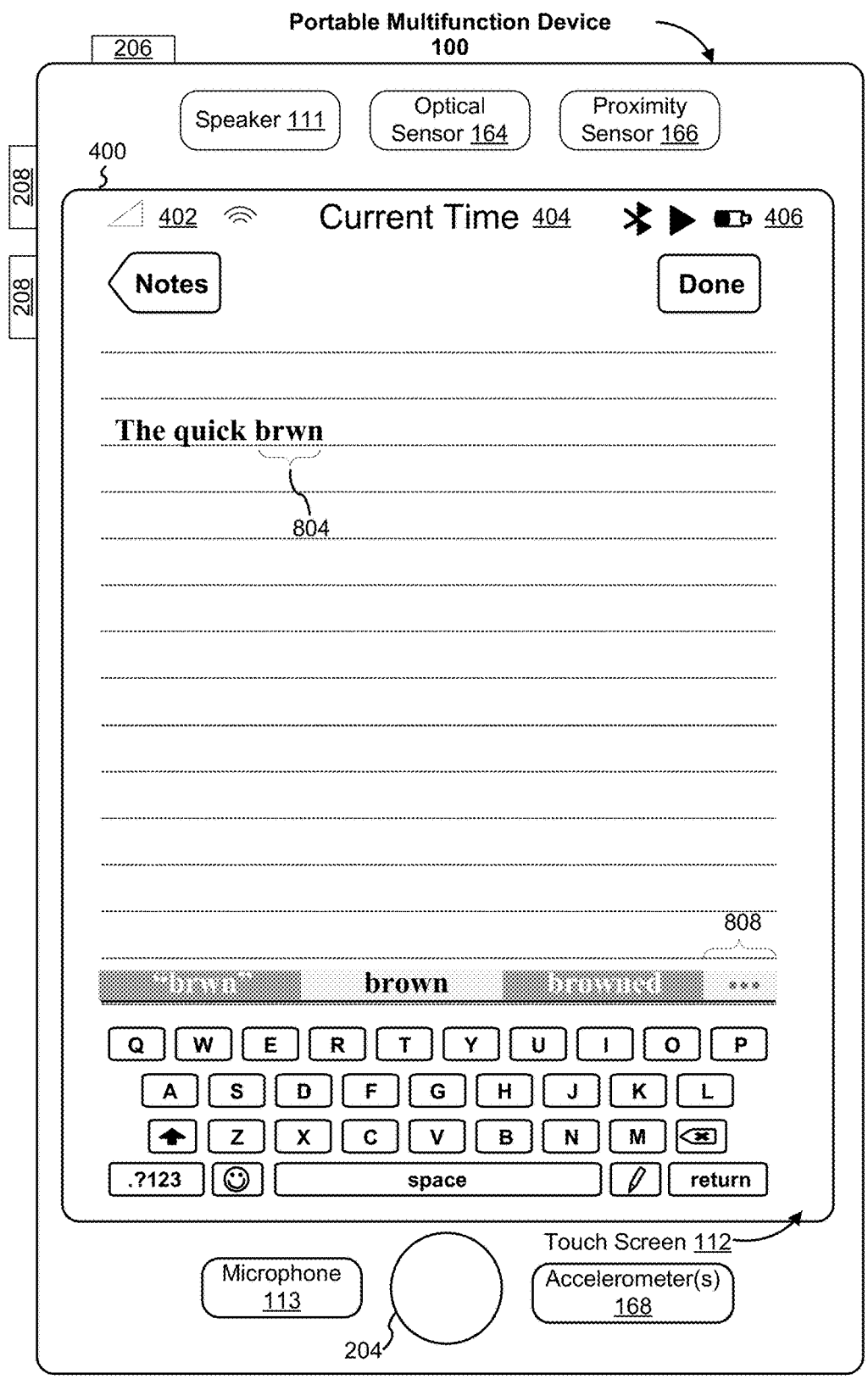

FIG. 8B illustrates an embodiment where a row of keyboard options corresponding to a selection of characters 804 made on a virtual keyboard with an additional keyboard options affordance within the row 808. Because the number of keyboard options corresponding to the selection of characters exceeds the available space in the row, the additional keyboard options affordance is displayed within the row. The additional keyboard options affordance provides an indication that even more options are available beyond the options shown currently in the row. In this example, the affordance is provided as an arrangement of dots.

Figure 8C:
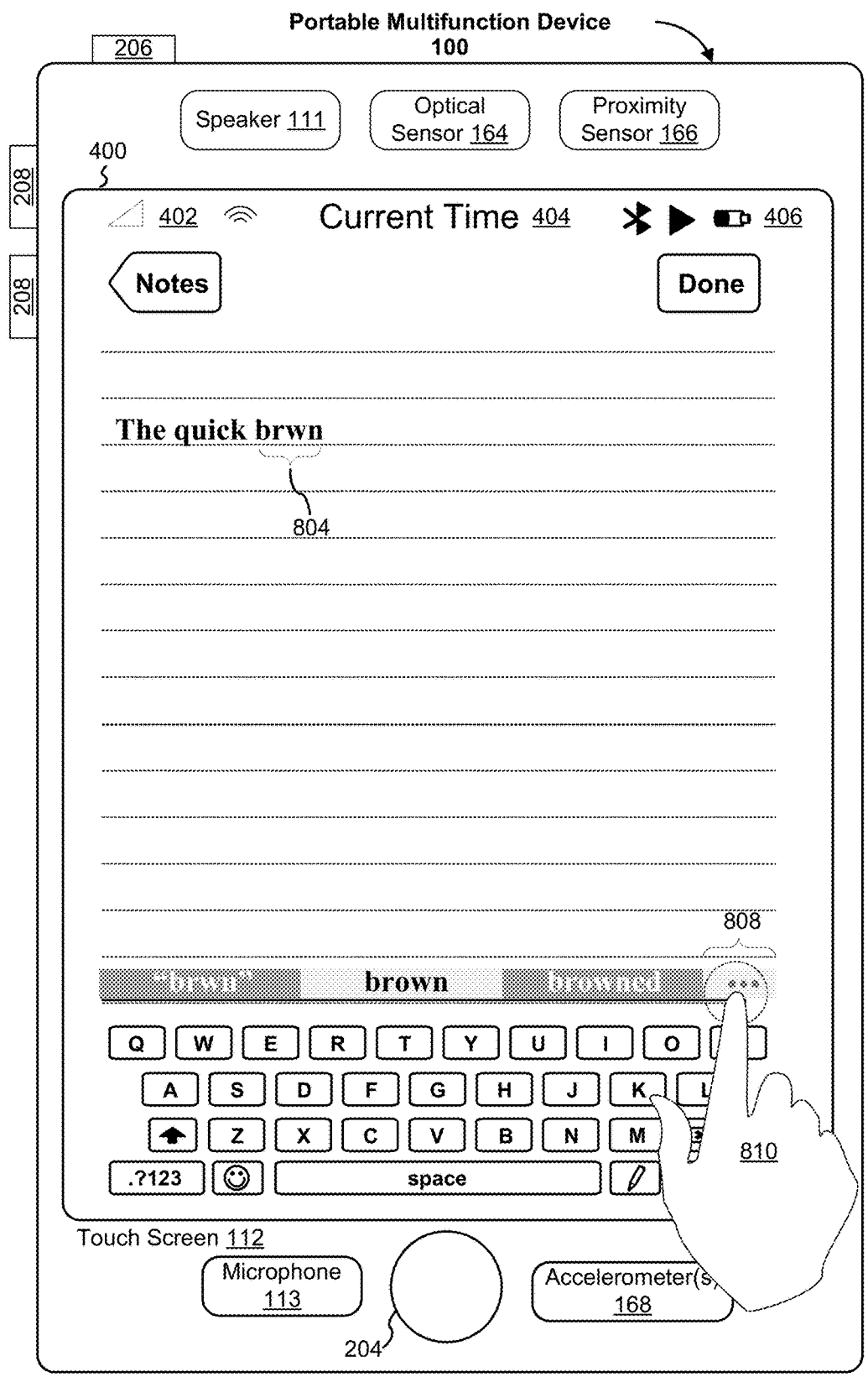

FIG. 8C illustrates an embodiment of the selection 810 of the additional keyboard options affordance 808 corresponding to a selection of characters 804 made on a virtual keyboard. In this example, a single tap selection on designated area of the touch-sensitive display displaying the arrangement of dots. In some embodiments, the selection of the additional keyboard options affordance may be assigned a predefined tap selection for single tap, a press, or a hold on the area of the additional keyboard options affordance.

Figure 8D:
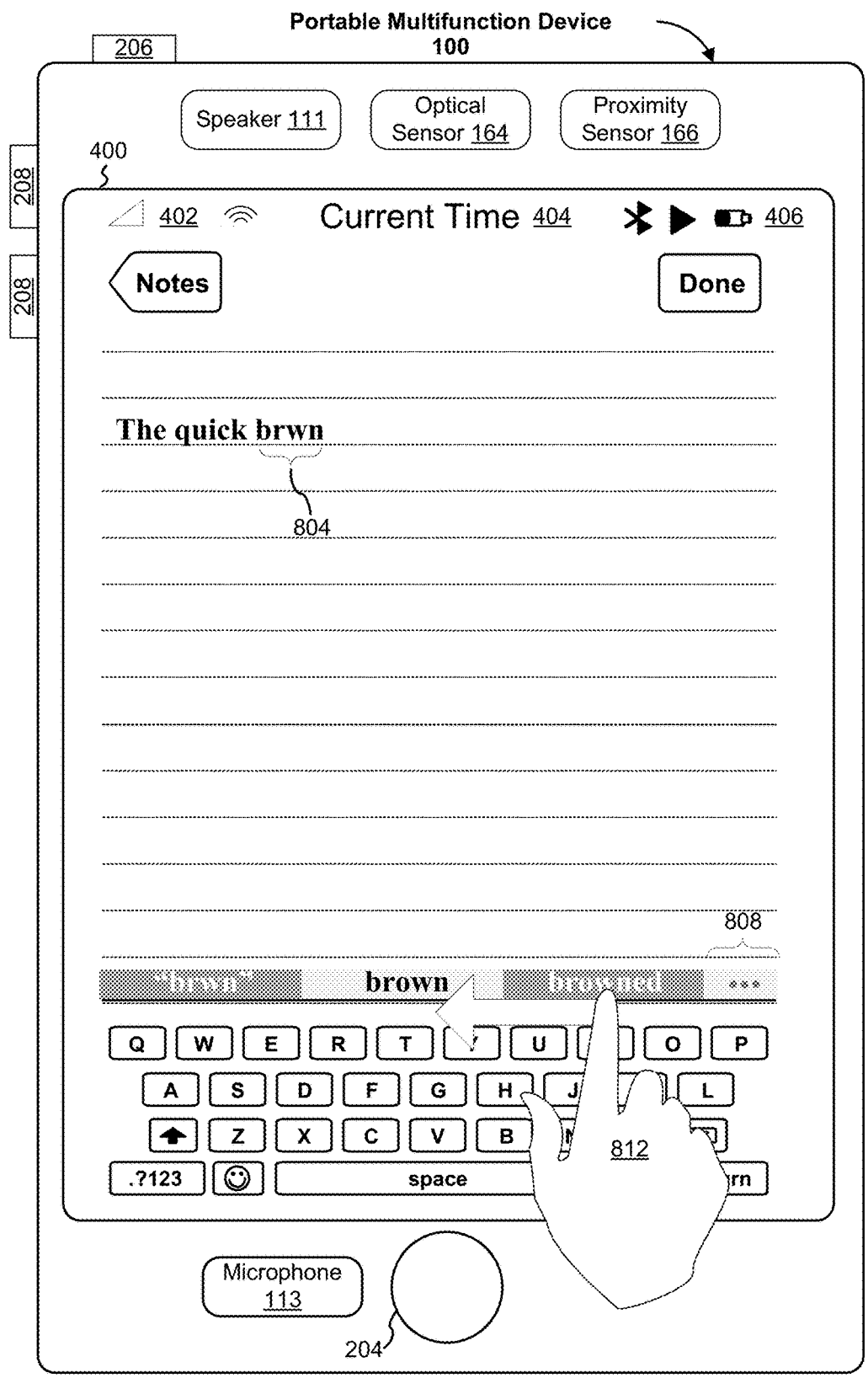

FIG. 8D illustrates an embodiment of touch-scrolling through the additional keyboard options upon receiving a scrolling gesture at the row of one or more keyboard options 812 on the touch-sensitive display. The availability of the additional keyboard options affordance 808 indicates to a user that they may scroll through the keyboard options using a scrolling gesture. In some embodiments, the velocity of the scrolling gesture increases the speed at which the keyboard options are scrolled. In some embodiments, the scrolling gesture is over the designated area displaying the arrangement of dots 808. In some embodiments, the scrolling gesture is anywhere over the area displaying the keyboard options (e.g., the row above the character keys).

Figure 8E:
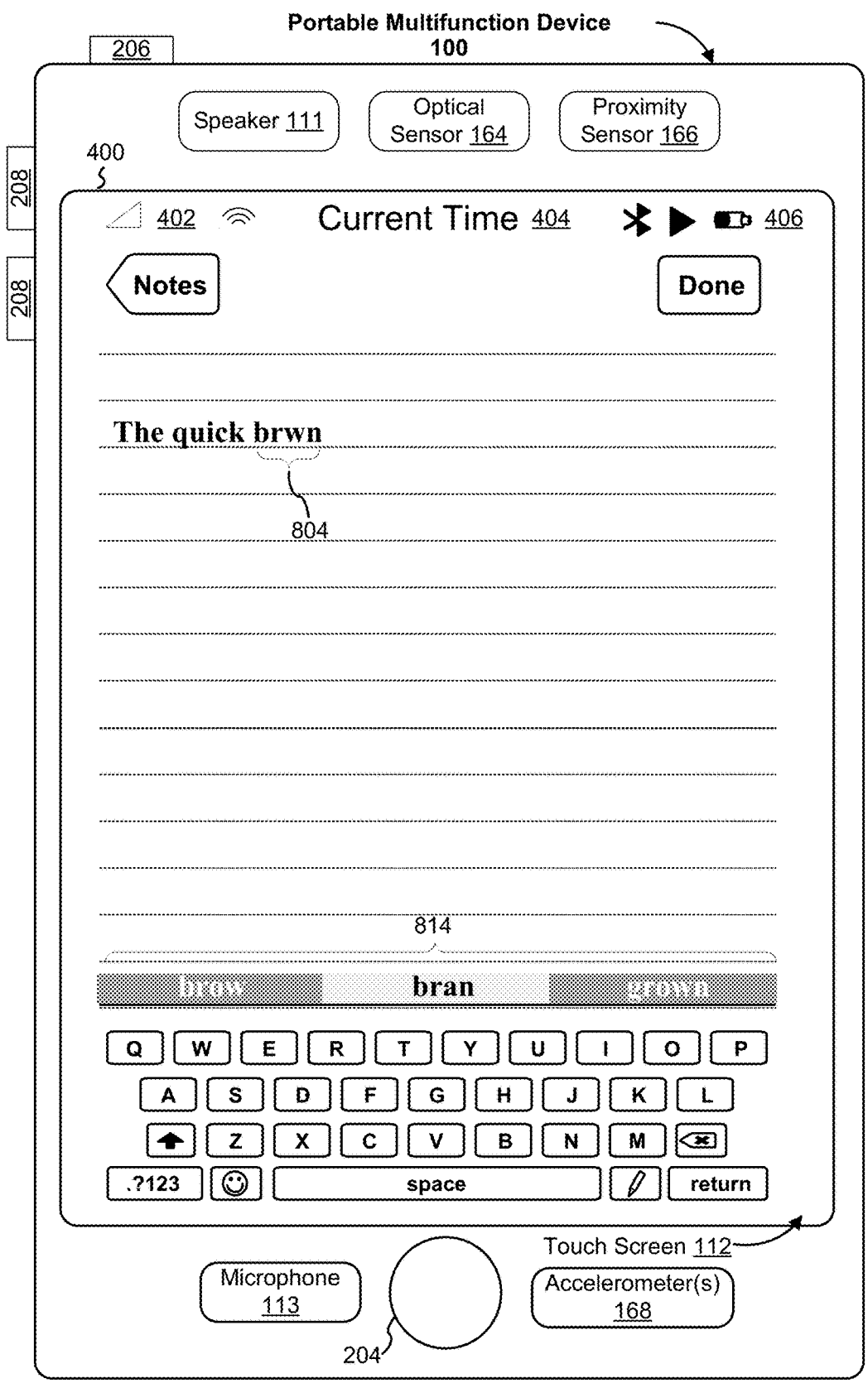

FIG. 8E illustrates an embodiment displaying additional keyboard options 814 in response to the selection of the additional keyboard options affordance based on the character selection 804. The displayed additional keyboard options "brow", "bran", and "grown" are different than the previously shown keyboard options as shown in previous FIG. 8D which displayed "brwn", "brown", and "browned". In this example there are three additional keyboard options. In some embodiments, the amount of additional keyboard options may be limited to a greater number of options.

Figure 8F:
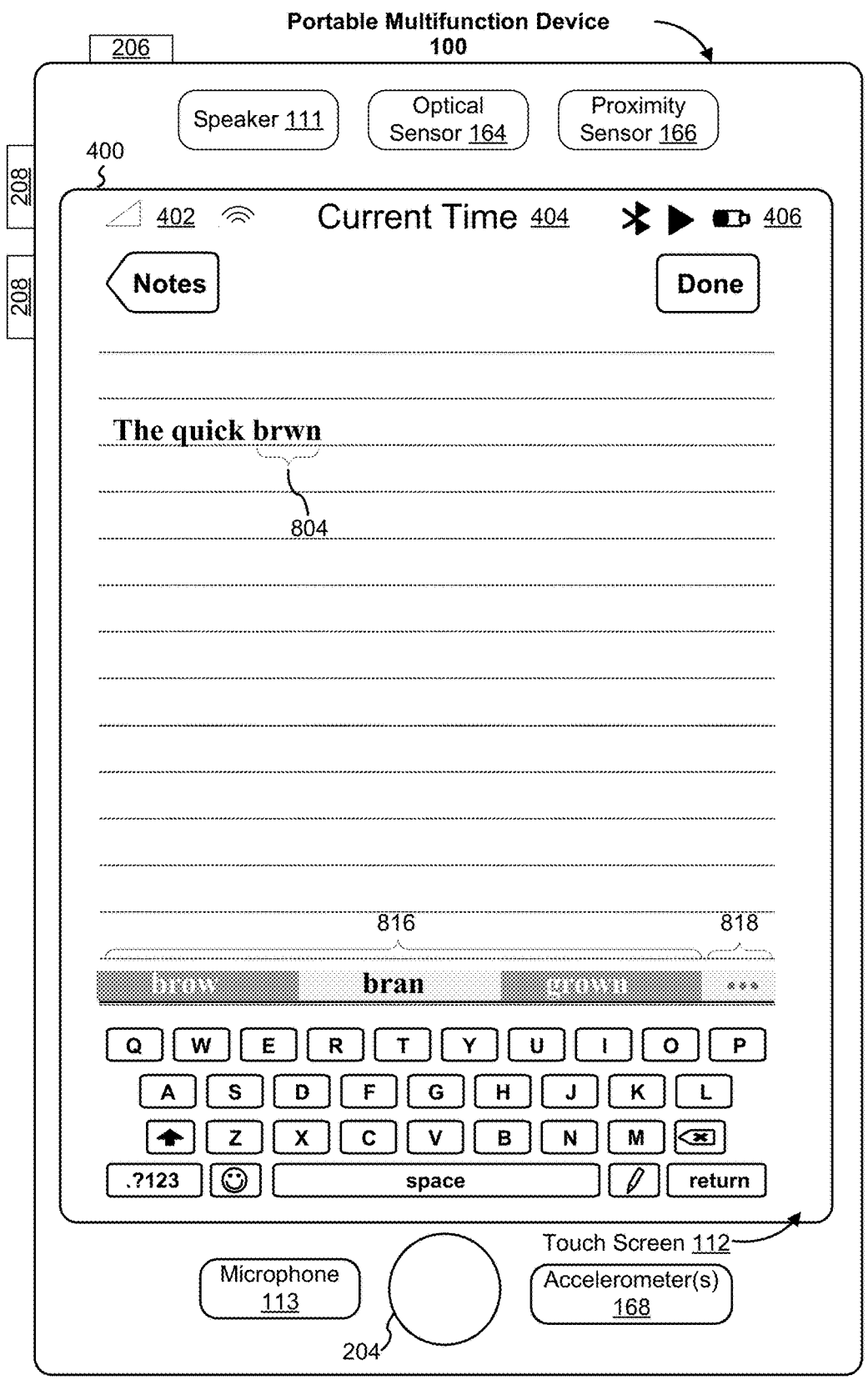

FIG. 8F illustrates an embodiment of additional keyboard options in response to the selection of the additional keyboard options affordance based on the character selection 804. In this example, the additional keyboard options are shifted in the row slightly 816 to account for a further keyboard options affordance 818. In some embodiments, a selection of the further keyboard options affordance removes the previously displayed options and displays further additional keyboard options. This process of the selection of a next sequential level of keyboard options affordances and corresponding keyboard options may be repeated for the amount of keyboard options available for the character selection.

Figure 8G:
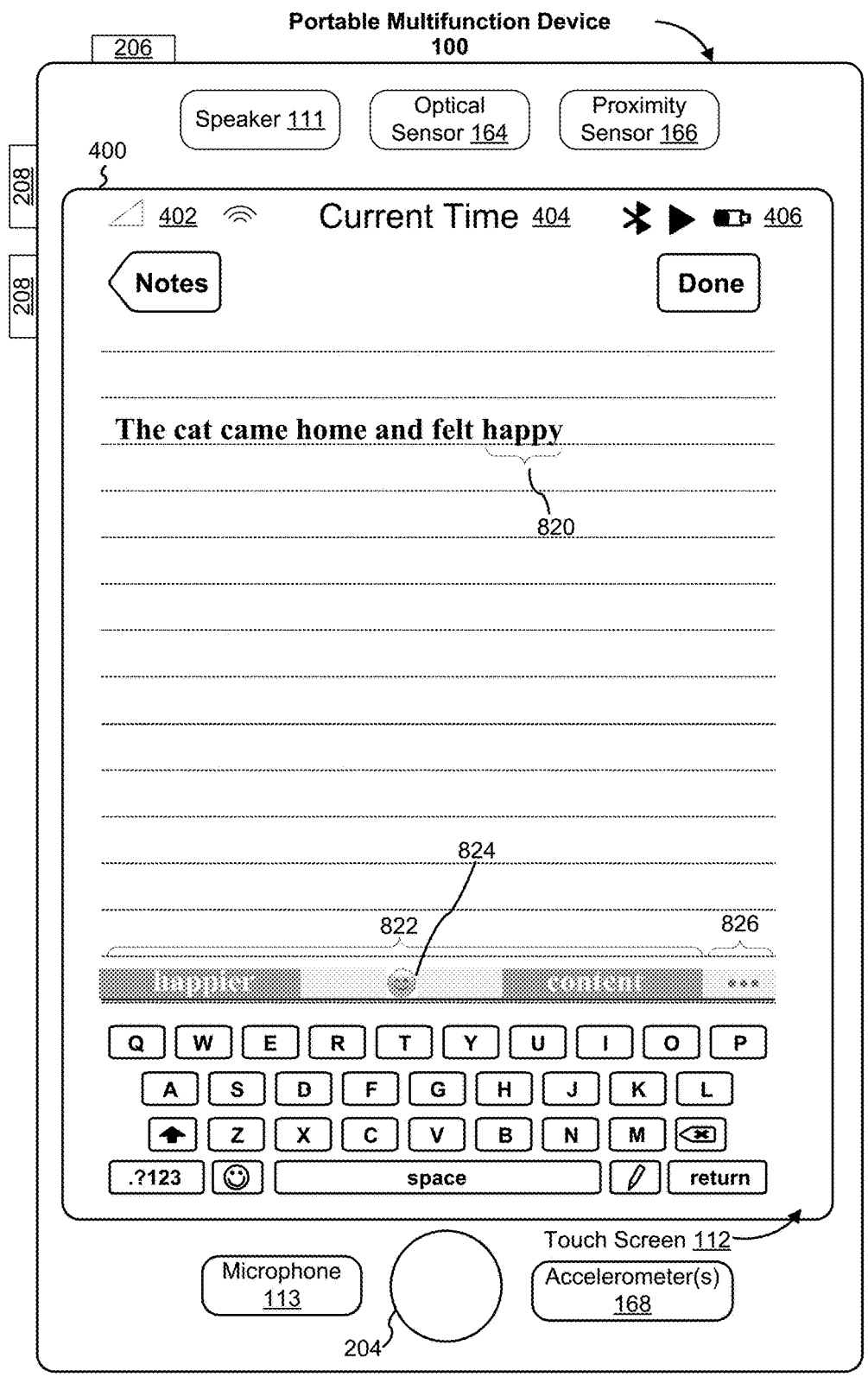

FIG. 8G illustrates an embodiment where one of the keyboard options 822 is an emoji character 824 associated with the character selection 820. In this example, the character selection of "happy" provides for the keyboard options of "happier", "content", and an emoji character representing a happy face. The emoji character is associated with the character selection. In this example, the additional keyboard options affordance 826 shows that additional keyboard options are available.

Figure 8H:
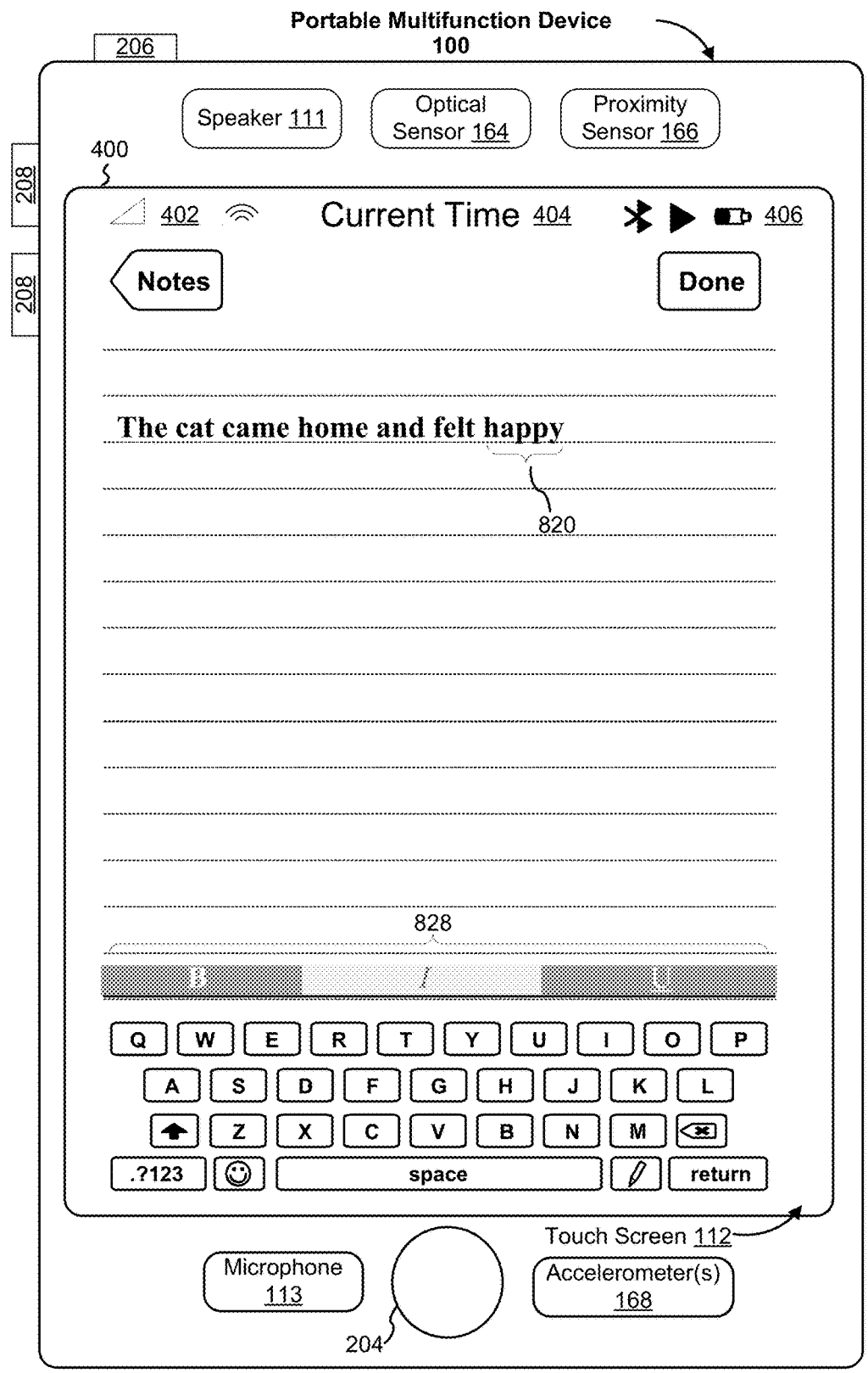

FIG. 8H illustrates an embodiment of the one of the keyboard options providing for formatting functions 828 in association with the character selection 820. In this example, the character selection is "happy" and the corresponding options include formatting functions such as bold function denoted by a bolded letter "B", italicized function denoted by an italicized letter "I", and underline function denoted by an underlined letter "U". In some embodiments, the formatting functions include, but are not limited to, font/color manipulation, spacing manipulation, and copy/cut and paste functionalities.

Figure 8I:
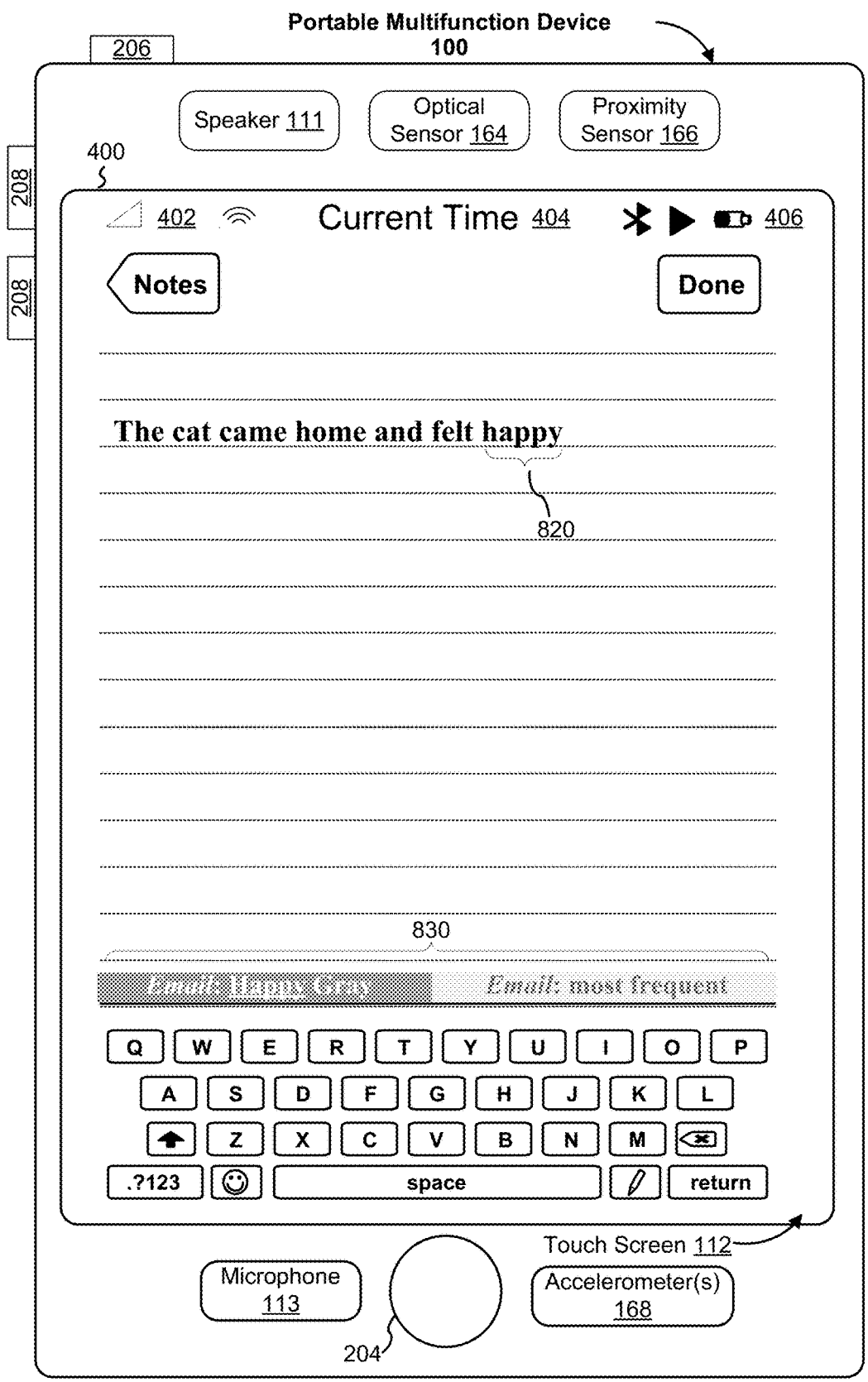

FIG. 8I illustrates an example of the one of the keyboard options providing third party affordances 830 for evoking a third party application or functions within a third party application, in association with the character selection 820. For example, the device will provide an option to copy the character selection into a third party application. In this example, the character selection is "happy" and the corresponding third party application selected or included in the keyboard options is email integration. In this example, the keyboard options provide for copying the character selection into a third party application (e.g. email).

FIGS. 9A-9B are flow charts illustrating a method 900 for providing additional keyboard options for a virtual keyboard in accordance with some embodiments. The method 900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display). Some operations in method 900 are, optionally, combined and/or the order of some operations is, optionally, changed.

As described below, the method 900 provides an easy way for providing additional keyboard options for a virtual keyboard.

The device displays (902) the virtual keyboard comprising alphanumeric keys and a row of one or more keyboard options disposed above or below the alphanumeric keys. FIG. 8A, for example, displays a virtual keyboard 802 and a row of one or more keyboard options disposed above the alphanumeric keys 806. In some embodiments, there may be a text input region between the alphanumeric keys and the row of one or more keyboard options.

Next, the device determines (904) that additional keyboard options are available. FIG. 8B, for example, provides for the device to determine that the character selection of "brwn" results in predictive text options shown in the row of one or more keyboard options as "brown" or "browned". The additional keyboard options are available when the one or more keyboard options exceed the space of the row.

In some embodiments, the additional keyboard options comprise affordances selected from a group consisting of: predictive text input, emoji characters, frequently used input, and formatting functions (906). FIG. 8G, for example, illustrates the keyboard options providing an emoji character 824 happy face for selection in response to the character selection 820. FIG. 8H, for example, illustrates the keyboard options providing formatting functionalities 828 namely bold, italics, and underline to be associated with the character selection 820.

In some embodiments, the additional keyboard options provide for affordances for third party applications (908). FIG. 8I, for example, illustrates the additional keyboard options providing email functionalities 830 based on character selection 820.

Next, the device determines in accordance with a determination that additional keyboard options are available, displaying an additional keyboard options affordance within the row (910). FIG. 8B, for example, illustrates that the additional keyboard options exceed the available space in the row, thus the additional keyboard options affordance 808 is displayed within the row. In some embodiments, the additional keyboard options affordance is displayed adjacent to the row either above or beneath the row. In some embodiments, the additional keyboard options affordance is disposed at a separate location away from the row.

In some embodiments, the additional keyboard options affordance comprises a first arrangement of dots (912). FIG. 8B, for example, illustrates the additional keyboard options affordance displayed within the row as an arrangement of dots 808. In some embodiments, the additional keyboard options affordance comprises an affordance to be pulled like a "tongue."

In some embodiments, the device determines if the additional keyboard options exceed the available space in the row (914). In response to this determination, the device displays a further keyboard options affordance (916). FIG. 8F, for example, illustrates the additional keyboard options exceeding the available space as denoted by further keyboard options affordance 818; the selection of which will provide further additional keyboard options. In some embodiments, the further keyboard options affordance comprises a second arrangement of dots (918). FIG. 8F, for example, illustrates the further keyboard options affordance 818 as a second arrangement of dots.

In some embodiments, the device receives a scrolling gesture at the row of one or more keyboard options (920). FIG. 8D, for example, illustrates a scrolling gesture at the row of one or more keyboard options 812 based on the character selection 804. In response to the receiving the scrolling gesture, the device ceases to display the one or more keyboard options and display at least some of the additional keyboard options in the row, wherein the additional keyboard options are different than the one or more keyboard options (922).

Next, upon detection of a selection of the additional keyboard options affordance, the device ceases to display at least some of the one or more keyboard options and display at least some of the additional keyboard options in the row. FIG. 8C, for example, provides for an additional keyboard options affordance selection 810 being detected. The current keyboard options are "brwn", "brown", and "browned". FIG. 8E, for example, following FIG. 8C, illustrates additional keyboard options in the row 814, namely "brow", "bran", and "grown" and ceases to display the earlier options of "brwn", "brown", and "browned".

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 900, 1200, 1500 are also applicable in an analogous manner to method 900 described above with respect to FIGS. 9A-9B. For brevity, these details are not repeated here.

Figure 10:
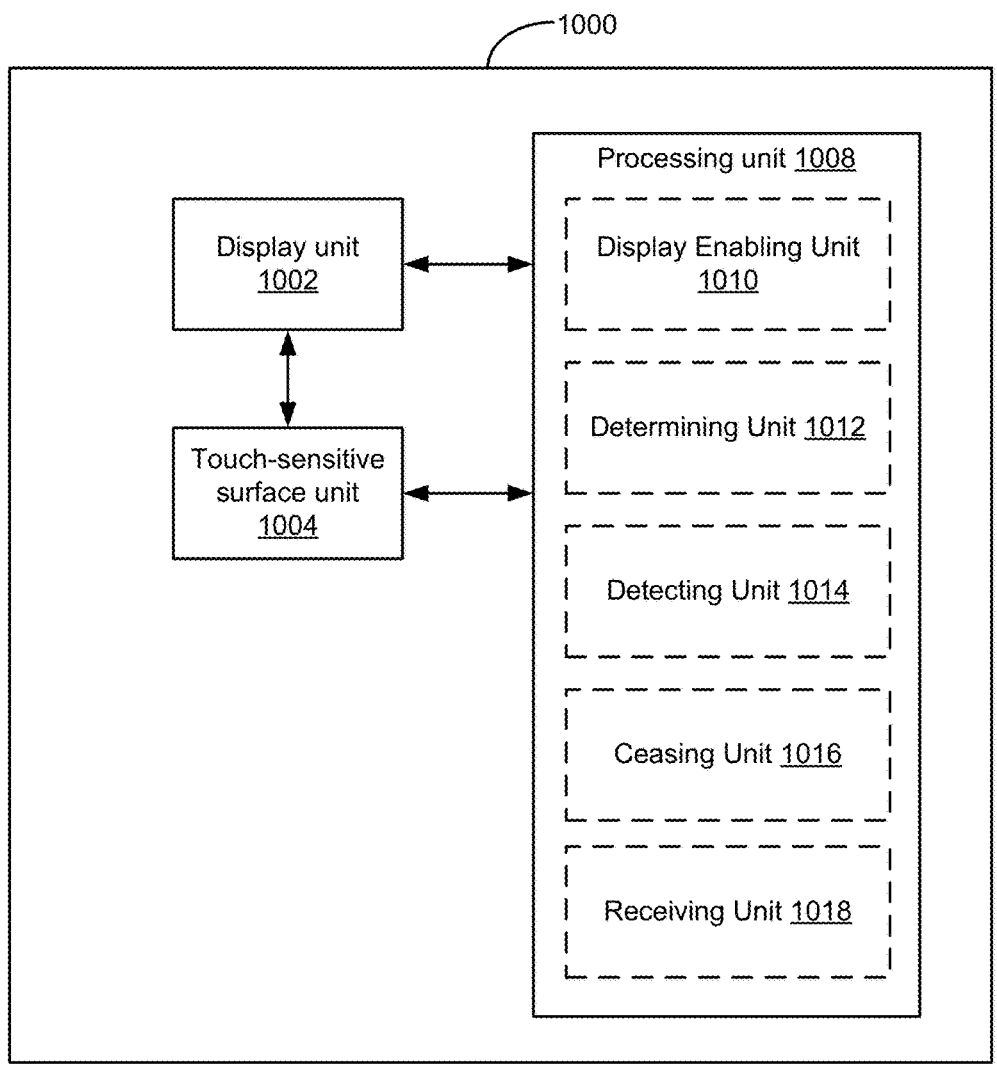
FIG. 10 is a functional block diagram of an electronic device illustrating the modules for providing additional keyboard options for a virtual keyboard, in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002 configured to display a user interface, a touch-sensitive surface unit 1004 configured to receive contacts and a processing unit 1008 coupled with the display unit 1002 and the touch-sensitive surface unit 1004. In some embodiments, the processing unit 1008 includes: a display enabling unit 1010, a determining unit 1012, a detecting unit 1014, a ceasing unit 1016, and a receiving unit 1018.

The processing unit 1008 is configured to enable display (e.g., with the display enabling unit 1010) of a virtual keyboard comprising alphanumeric keys and a row of one or more keyboard options disposed above or below the alphanumeric keys. The processing unit is further configured to determine (e.g., with the determining unit 1012) that additional keyboard options are available. In accordance with a determination that additional keyboard options are available, the processing unit is further configured to enable display (e.g., with the display enabling unit 1010) of an additional keyboard options affordance within the row. Upon detection (e.g., with the detecting unit 1014) of a selection of the additional keyboard options affordance, the processing unit is further configured to cease (e.g., with the ceasing unit 1016) to enable display of at least some of the one or more keyboard options and enable display of at least some of the additional keyboard options in the row.

In some embodiments, the additional keyboard options affordance comprises a first arrangement of dots on the touch-sensitive display 1004.

In some embodiments, the processing unit 1008 is further configured to determine (e.g., with the determining unit 1012) if the additional keyboard options exceed the available space in the row. In response to determining the additional keyboard options exceed the available space in the row, the processing unit is further configured to enable display (e.g., with the display enabling unit 1010) of a further keyboard options affordance.

In some embodiments, the further keyboard options affordance comprises a second arrangement of dots on the touch-sensitive display 1004.

In some embodiments, the processing unit 1008 is further configured to receive (e.g., with the receiving unit 1018) a scrolling gesture at the row of one or more keyboard options. In response to receiving the scrolling gesture, the processing unit is further configured to cease (e.g., with the ceasing unit 1016) to enable display of the one or more keyboard options and enable display (e.g., with the display enabling unit 1010) of at least some of the additional keyboard options in the row. The additional keyboard options are different than the one or more keyboard options.

In some embodiments, any of the keyboard options and the additional keyboard options, on the touch-sensitive display 1004, comprises affordances selected from a group consisting of: predictive text input, emoji characters, frequently used input, and formatting functions.

In some embodiments, any of the keyboard options and the additional keyboard options provides for affordances for third party applications on the touch-sensitive display 1004.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9B, optionally, implemented by components depicted in FIGS. 1A-1B or FIG. 10. For example, display operation 902, determine operation 904, display operation 910, receive operation 920, cease operation 922 are, optionally, implemented by display enabling unit 1010, determining unit 1012, display enabling unit 1010, receiving unit 1018, and ceasing unit 1016. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selecting Virtual Keyboard Modes

FIGS. 11A-11E illustrate exemplary user interfaces for selecting virtual keyboard modes in accordance with some embodiments. The user interfaces in these figures are used to illustrate the processes described below, including the processes in FIG. 12. For convenience of explanation, some of the embodiments will be discussed with reference to operations performed on a device with a touch-sensitive display 112.

Figure 11A:
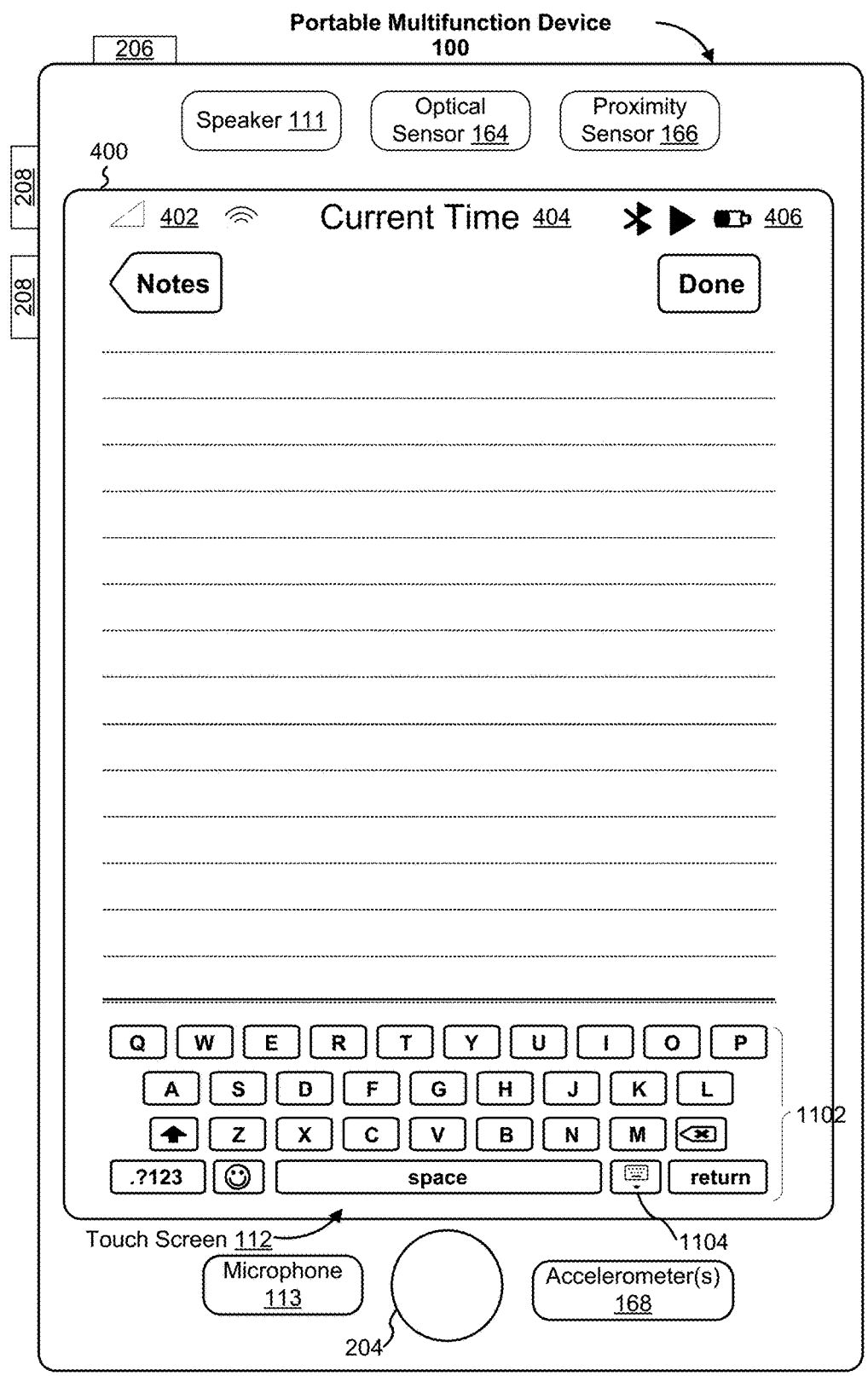
FIGS. 11A-11E illustrates exemplary user interfaces for selecting virtual keyboard modes in accordance with some embodiments.

FIG. 11A illustrates an embodiment of displaying a first virtual keyboard 1102 with a dedicated multi-keyboard key 1104. In this example, the first virtual keyboard takes up the full width of the touch-sensitive display. In this example, the first virtual keyboard comprising a first set of keys corresponding to Roman characters in association with a first language (e.g., English). In some embodiments, the first virtual keyboard may be of a language other than English and utilize characters other than Roman.

Figure 11B:
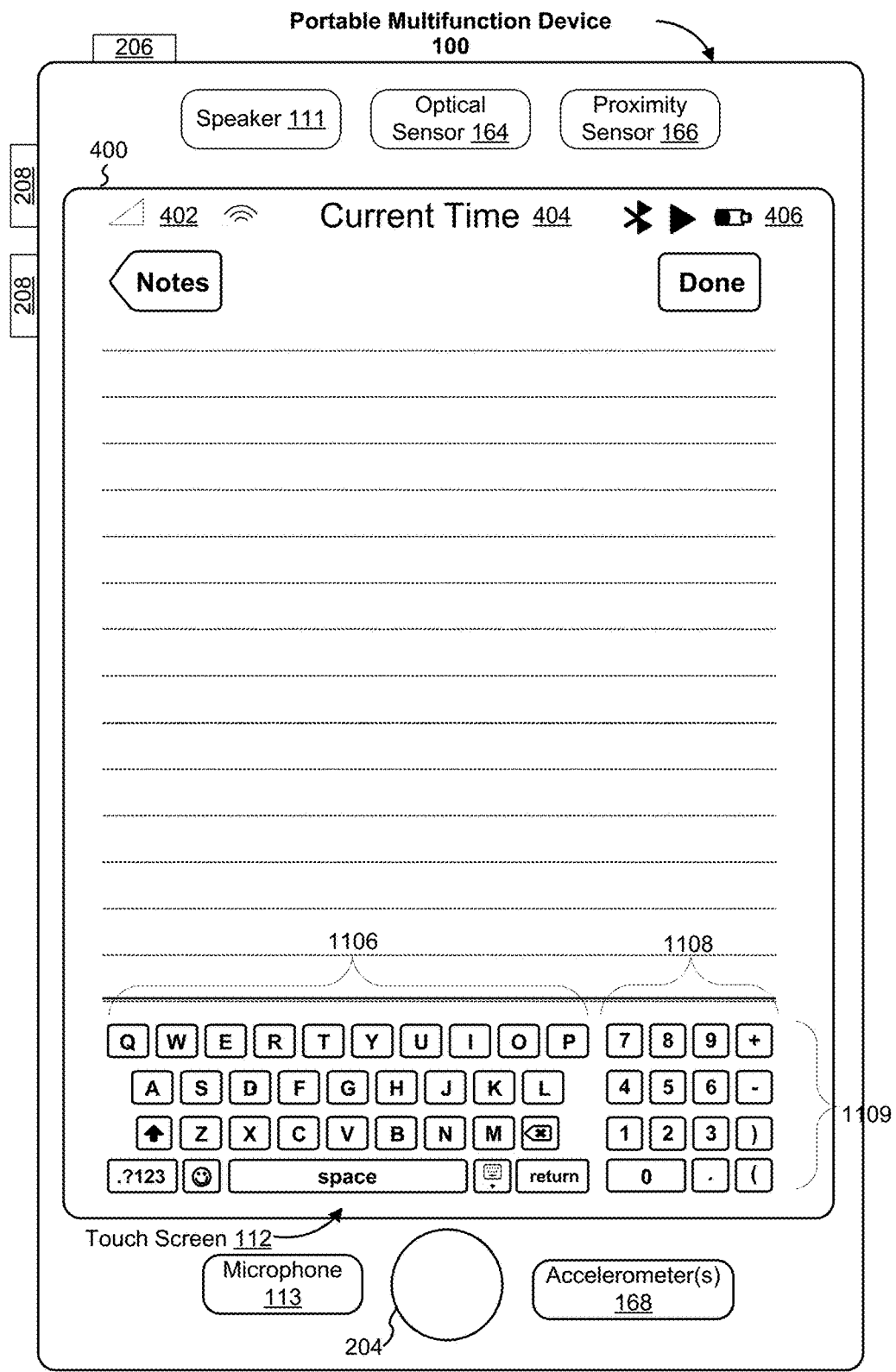

FIG. 11B illustrates an embodiment of a second virtual keyboard 1106 and a distinct user input area 1108. In this example, the distinct user input area is a number pad with a plurality of virtual keys of numbers and other operations. The second virtual keyboard and distinct user input area are displayed upon detection of a selection of the dedicated multi-keyboard key of FIG. 11A denoted 1104, ceasing to display the first virtual keyboard. In this example, the width of the second virtual keyboard is two thirds the width of the first virtual keyboard. Furthermore, the number pad has one third the width of the first virtual keyboard.

Figure 11C:
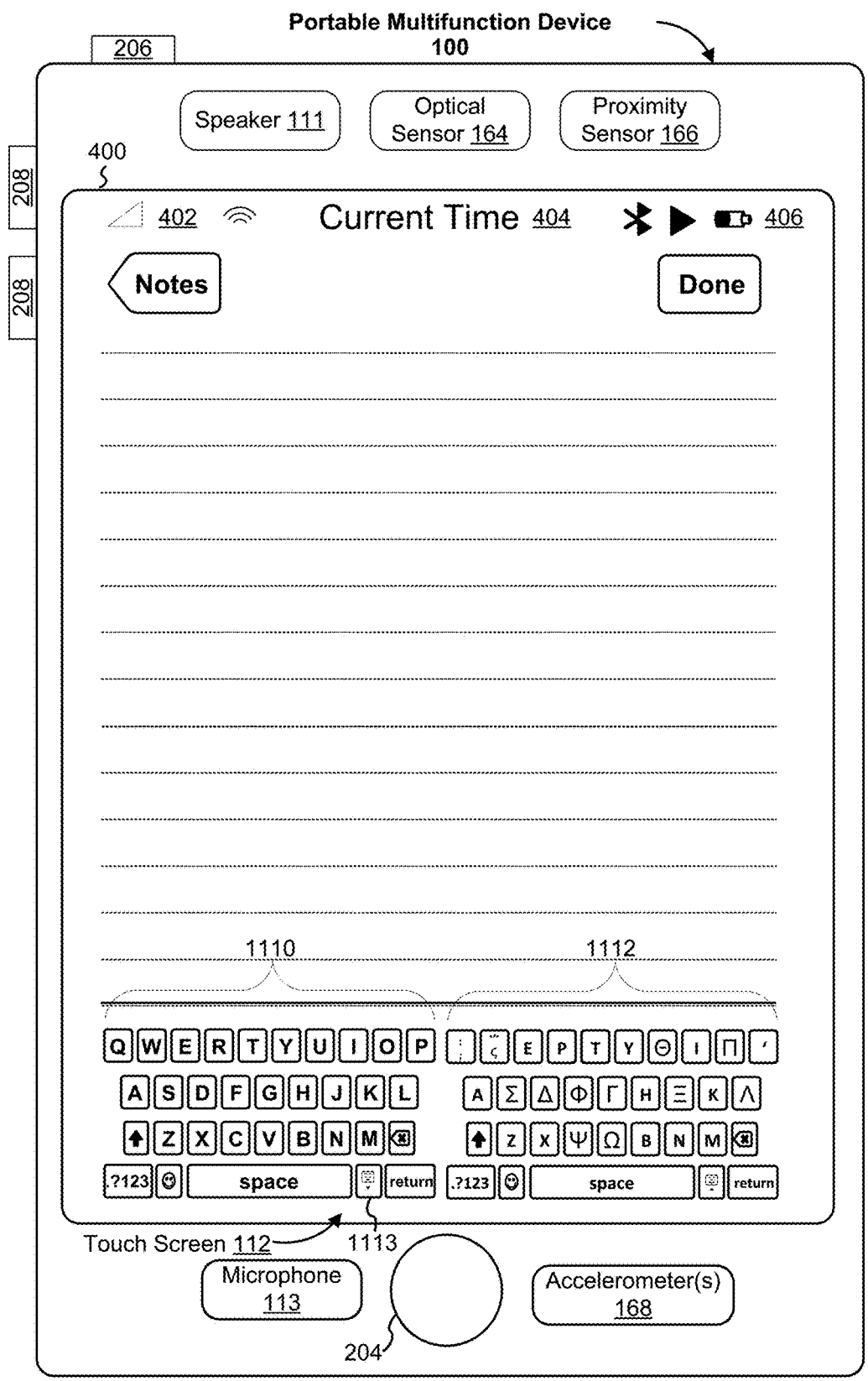

FIG. 11C illustrates an embodiment of a second virtual keyboard 1110 and a distinct user input area as a third virtual keyboard 1112 comprising a plurality of virtual keys corresponding to Greek characters script in association with a first language (e.g., Greek). The second virtual keyboard and third virtual keyboard are displayed upon detection of a selection of the dedicated multi-keyboard key of FIG. 11A denoted 1104, ceasing to display the first virtual keyboard. In this example, the width of the second virtual keyboard and the third virtual keyboard are both one half the width of the first virtual keyboard.

Figure 11D:
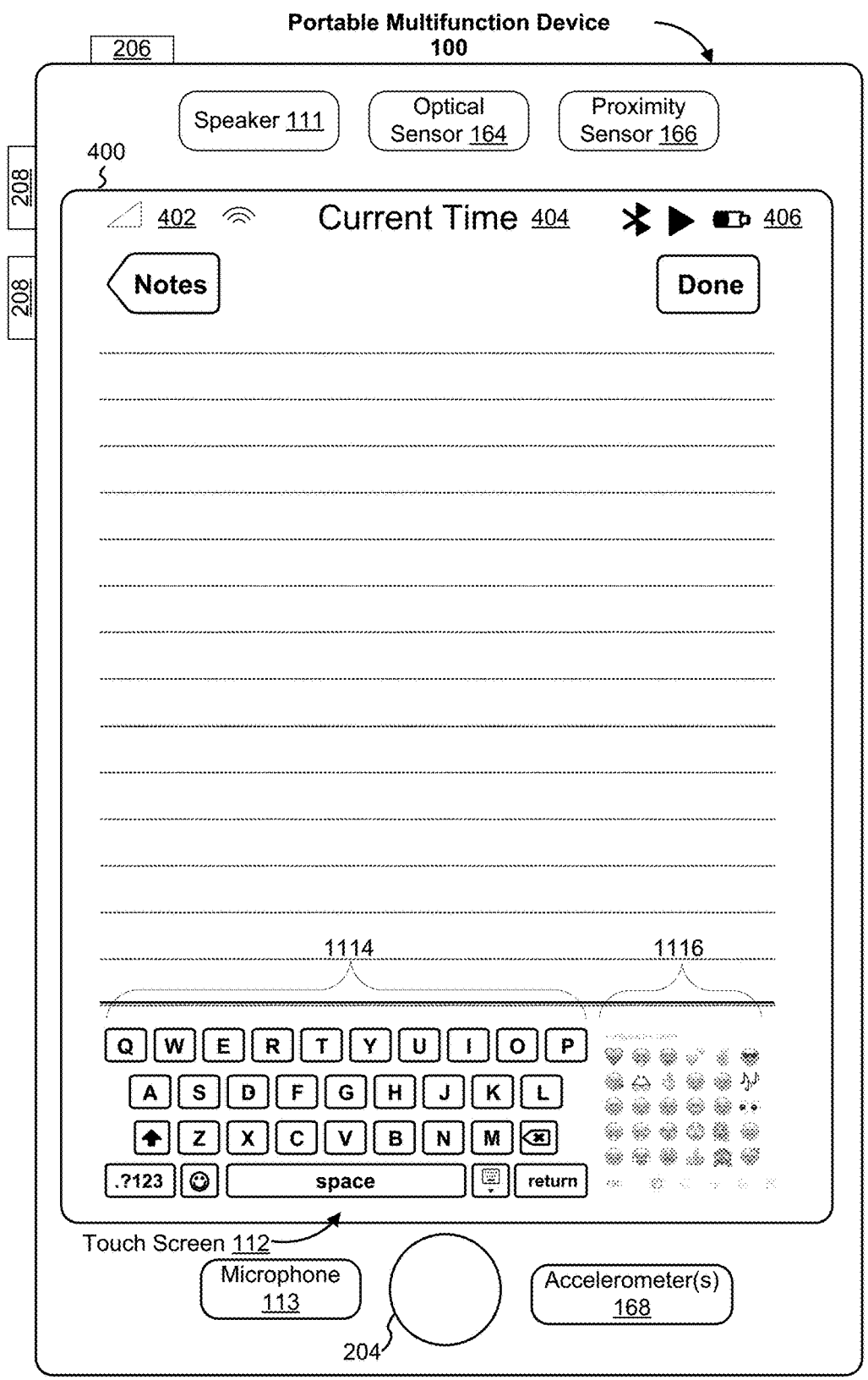

FIG. 11D illustrates an embodiment of a second virtual keyboard 1114 and a distinct user input area as a third virtual keyboard 1116 with a plurality of virtual keys utilizing emoji characters outputting emoji characters. The second virtual keyboard and third virtual keyboard are displayed upon detection of a selection of the dedicated multi-keyboard key of FIG. 11A denoted 1104, ceasing to display the first virtual keyboard. In this example, the width of the second virtual keyboard is two thirds the width of the first virtual keyboard and the third virtual keyboard is one third the width of the width of the first virtual keyboard.

Figure 11E:
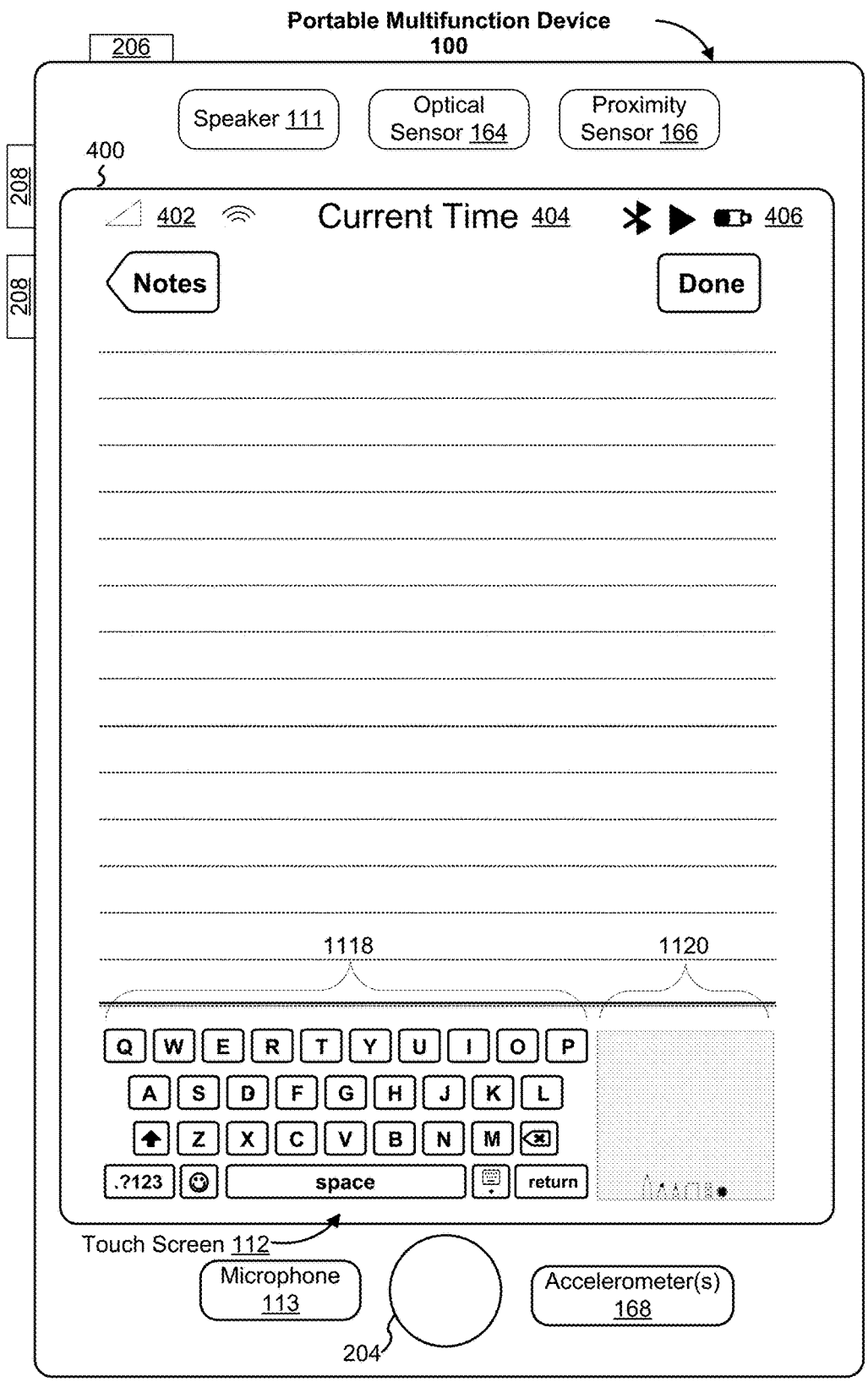

FIG. 11E illustrates an embodiment of a second virtual keyboard 1118 and a distinct user input area 1120. The second virtual keyboard and distinct user input area are displayed upon detection of a selection of the dedicated multi-keyboard key of FIG. 11A denoted 1104, ceasing to display the first virtual keyboard. In this example, the distinct user input area is a drawing input area with a plurality of drawing tools. In this example, the tools include various types of stroke functionalities such as pencil, marker, pen, eraser, and ruler. In some embodiments, the drawing input area provides for advanced image editing tools. In some embodiments, the drawing input area may, upon selection, preload preexisting images or drawings into the area. A preexisting image may be edited further in the drawing input area. In this example, the width of the second virtual keyboard is two thirds the width of the first virtual keyboard and the drawing input area is one third the width of the width of the first virtual keyboard.

FIG. 12 is a flow chart illustrating a method 1200 for selecting virtual keyboard modes in accordance with some embodiments. The method 1200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display)

As described below, the method 1200 provides an easy way for selecting virtual keyboard modes for a virtual keyboard.

The device displays (1202) a first virtual keyboard comprising a first plurality of virtual keys that occupy an area of a first size. The second virtual keyboard and distinct user input area are displayed upon detection of a selection of the dedicated multi-keyboard key of FIG. 11A denoted 1104, ceasing to display the first virtual keyboard. The first plurality of virtual keys includes a dedicated multi-keyboard key. FIG. 11A, for example, displays a first virtual keyboard 1102 and a dedicated multi-keyboard key 1104. In some embodiments, the dedicated keyboard key is predefined. In some embodiments, the dedicated multi-keyboard key is assigned to a designated key. In some embodiments, the selection of the dedicated multi-keyboard key may be selected by a single tap, a press, or a hold on the area of the dedicated multi-keyboard key.

In some embodiments, the area of a first size and the area of a second size have at least one of height or length in common (1204). FIG. 11B, for example, illustrates that the second virtual keyboard 1106 and the number pad 1108 have the same height 1109.

Next, upon detection of a selection of the dedicated multi-keyboard key, the device ceases to display the first virtual keyboard and display a second virtual keyboard. The second virtual keyboard having a second plurality of virtual keys; The device also displays a distinct user input area adjacent the second plurality of virtual keys, wherein the second plurality of virtual keys occupy an area of a second size less than the first size (1206). FIG. 11B, for example, illustrates that the second virtual keyboard 1106 is displayed with a number pad adjacent the second virtual keyboard, with the first virtual keyboard (as shown in FIG. 11A) ceases to display.

In some embodiments, the distinct user input area is a number pad (1208). FIG. 11B, for example, illustrates that the second virtual keyboard 1106 and the distinct user input area as a number pad. In some embodiments, the number pad comprises advanced mathematical functions. In some embodiments, the number pad comprises mathematical symbols.

In some embodiments, the distinct user input area is a third virtual keyboard comprising a third plurality of virtual keys. The third plurality of virtual keys corresponds to a language different from a language corresponding to the second virtual keyboard (1210). FIG. 11C, for example, illustrates that the second virtual keyboard 1110 and the distinct user input area as a third virtual keyboard 1112 displaying virtual keys with Greek characters. In some embodiments, the virtual keys for both the second and third keyboards may be Roman but the language of the third keyboard may be different than the second keyboard (e.g., English and Pinyin respectively).

In some embodiments, the distinct user input area is a third virtual keyboard comprising a third plurality of keys corresponding to emoji characters (1212). FIG. 11D, for example, illustrates that the second virtual keyboard 1114 and the distinct user input area as a third virtual keyboard 1116 displaying emoji characters. In some embodiments, the emoji characters may be generated or imported from a third party application.

In some embodiments, the distinct user input area is a drawing input area (1214). FIG. 11E, for example, illustrates that the second virtual keyboard 1118 and the distinct user input area as a drawing input area 1120 including drawing tools.

In some embodiments, the second virtual keyboard comprises a dedicated multi-keyboard key (1216). FIG. 11C, for example, illustrates a second virtual keyboard 1110 with a dedicated multi-keyboard key 1113.

In some embodiments, there are fewer second plurality of virtual keys than the first plurality of virtual keys (1218). For example, the first plurality of virtual keys being spanned full length of the touch-sensitive surface provides for enhanced functionalities, and all of the first plurality of virtual keys may not be associated with a conventional truncated keyboard.

In some embodiments, the size of each of the second plurality of virtual keys is smaller than the size of each of the first plurality of virtual keys (1220). FIG. 11C, for example, provides that the second virtual keyboard 1110 is a scaled version of a full keyboard spanning the length of the touch-sensitive display. In this example, there is no reduction in virtual keys between the first keyboard shown in FIG. 11A denoted 1102, and the second keyboard of FIG. 11C denoted 1110.

It should be understood that the particular order in which the operations in FIG. 12 has been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 900, 1200, 1500 are also applicable in an analogous manner to method 1200 described above with respect to FIG. 12. For brevity, these details are not repeated here.

Figure 13:
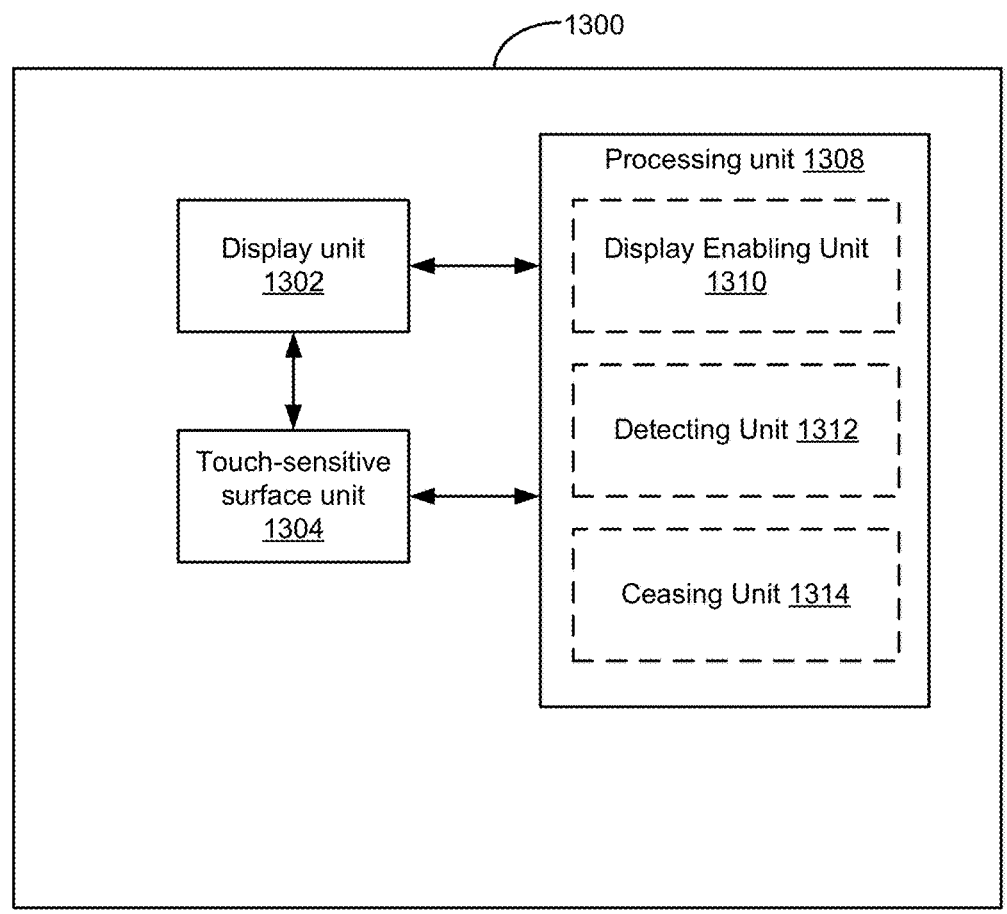
FIG. 13 is a functional block diagram of an electronic device illustrating the modules for selecting virtual keyboard modes, in accordance with some embodiments.

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, a touch-sensitive surface unit 1304 configured to receive contacts and a processing unit 1308 coupled with the display unit 1302 and the touch-sensitive surface unit 1304. In some embodiments, the processing unit 1308 includes: a display enabling unit 1310, a detecting unit 1312, and a ceasing unit 1314.

The processing unit 1308 is configured to: enable display (e.g., with the display enabling unit 1310) of a first virtual keyboard comprising a first plurality of virtual keys that occupy an area of a first size. The first plurality of virtual keys includes a dedicated multi-keyboard key. Upon detection of a selection of the dedicated multi-keyboard key, the processing unit is further configured to cease (e.g., with the ceasing unit 1314) to enable display of the first virtual keyboard and enable display of a second virtual keyboard. The second virtual keyboard comprises a second plurality of virtual keys and a distinct user input area adjacent the second plurality of virtual keys. The second plurality of virtual keys occupy an area of a second size less than the first size.

In some embodiments, the area of a first size and the area of a second size have at least one of height or length in common on the touch-sensitive display 1304.

In some embodiments, the distinct user input area is a number pad on the touch-sensitive display 1304.

In some embodiments, the distinct user input area is a third virtual keyboard comprising a third plurality of virtual keys corresponding to a language different from a language corresponding to the second virtual keyboard on the touch-sensitive display 1304.

In some embodiments, the distinct user input area is a third virtual keyboard comprising a third plurality of keys corresponding to emoji characters on the touch-sensitive display 1304.

In some embodiments, the distinct user input area is a drawing input area on the touch-sensitive display 1304.

In some embodiments, the second virtual keyboard comprises a dedicated multi-keyboard key on the touch-sensitive display 1304.

In some embodiments, there are fewer second plurality of virtual keys than the first plurality of virtual keys on the touch-sensitive display 1304.

In some embodiments, the size of each of the second plurality of virtual keys is smaller than the size of each of the first plurality of virtual keys on the touch-sensitive display 1304.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 12, optionally, implemented by components depicted in FIGS. 1A-1B or FIG. 13. For example, display operation 1202, detection operation 1206, ceasing operation 1206, display operation 1206, are, optionally, implemented by display enabling unit 1310, detecting unit 1312, display enabling unit 1310, ceasing unit 1314, and display enabling unit 1310. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selecting a Compact Virtual Keyboard

FIGS. 14A-14F illustrate exemplary user interfaces for selecting a compact virtual keyboard in accordance with some embodiments. The user interfaces in these figures are used to illustrate the processes described below, including the processes in FIG. 15. For convenience of explanation, some of the embodiments will be discussed with reference to operations performed on a device with a touch-sensitive display 112.

Figure 14A:
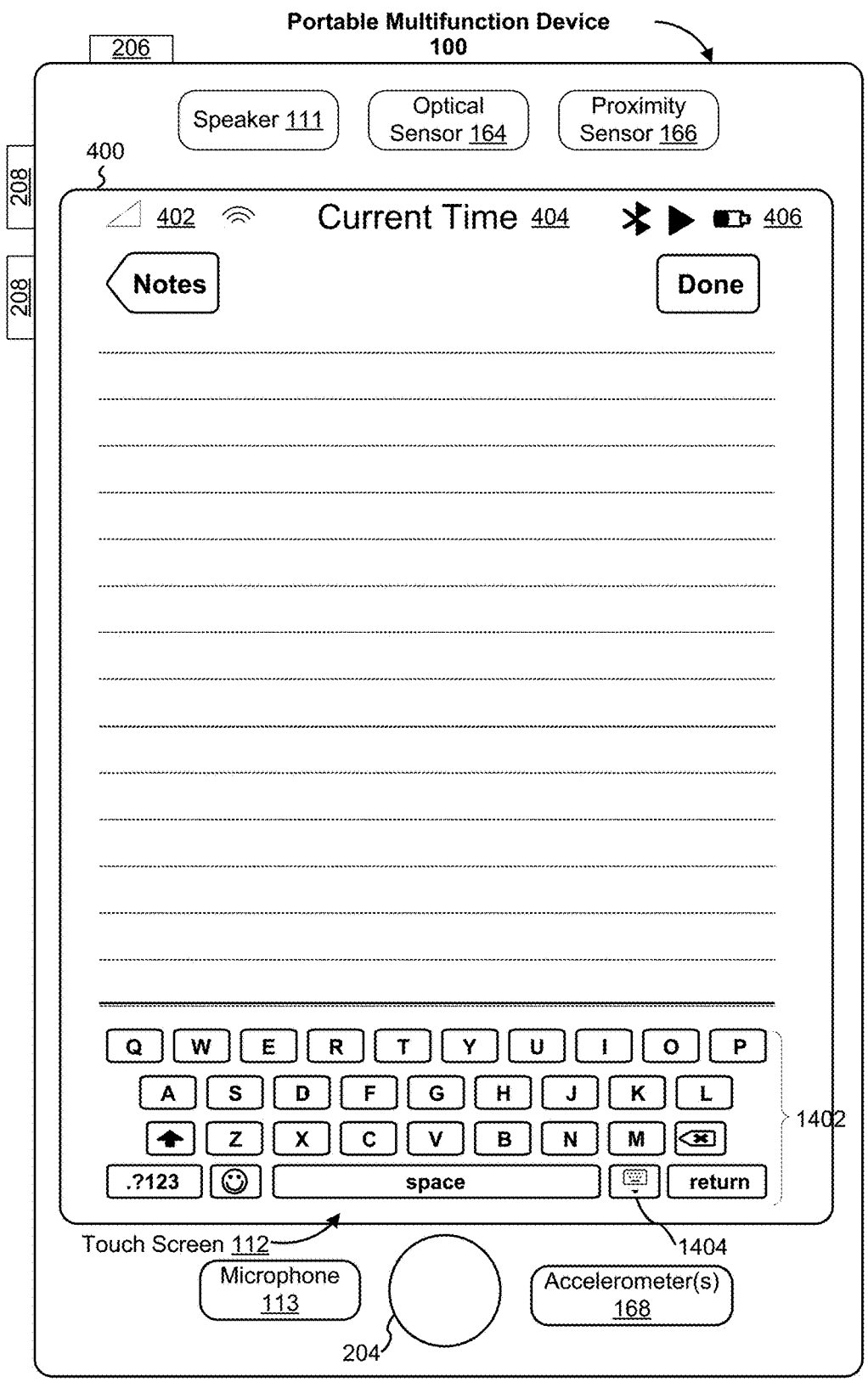
FIGS. 14A-14F illustrates exemplary user interfaces for selecting a compact virtual keyboard in accordance with some embodiments.

FIG. 14A illustrates an embodiment where a virtual keyboard 1402 with a dedicated multi-keyboard key 1404 is displayed. In this example, the size of the first virtual keyboard covers the full width of the touch-sensitive display. In this example, the first virtual keyboard comprising a first set of keys corresponding to Roman characters in association with a first language (e.g., English). In some embodiments, the first virtual keyboard may be of a language other than English and utilize characters other than Roman.

Figure 14B:
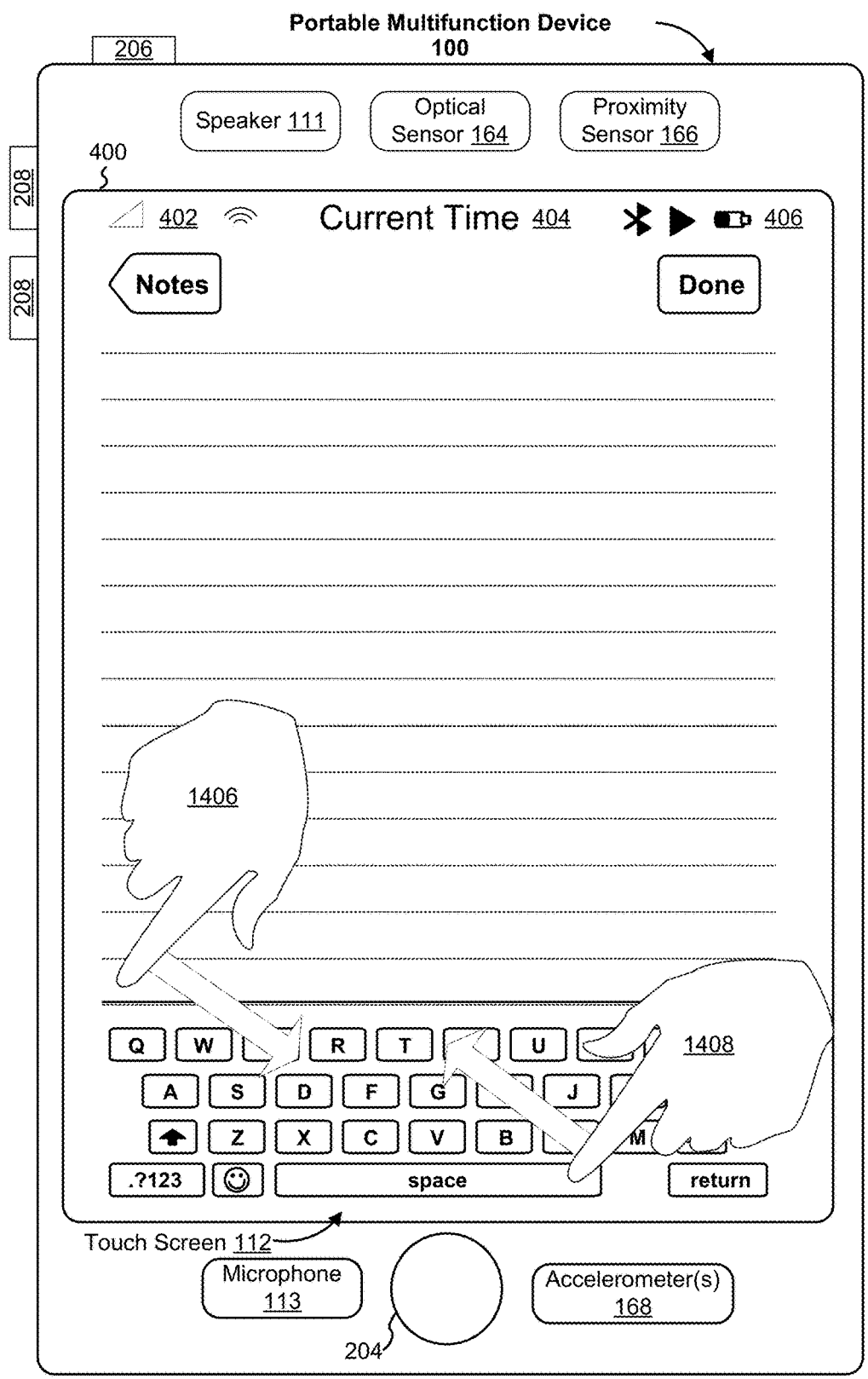

FIG. 14B illustrates an example of the detection of a pinch gesture on the touch-sensitive display. In this example, the user using two selections on the touch-sensitive display to drag the selections closer to one another as shown with the right index finger 1406 making a selection moving approximately in a south east direction, while the left index finger 1408 makes a selection moving approximately in a north west direction. In some embodiments, this is known as a pinch gesture, which can be performed using one hand. In some embodiments, a distinct gesture may be used to cease display of the virtual keyboard; for example a three finger swipe in any direction. In some embodiments, the selection of the dedicated multi-keyboard key may be used to positionally translate the virtual keyboard until the virtual keyboard ceases to display and show the compact virtual keyboard.

Figure 14C:
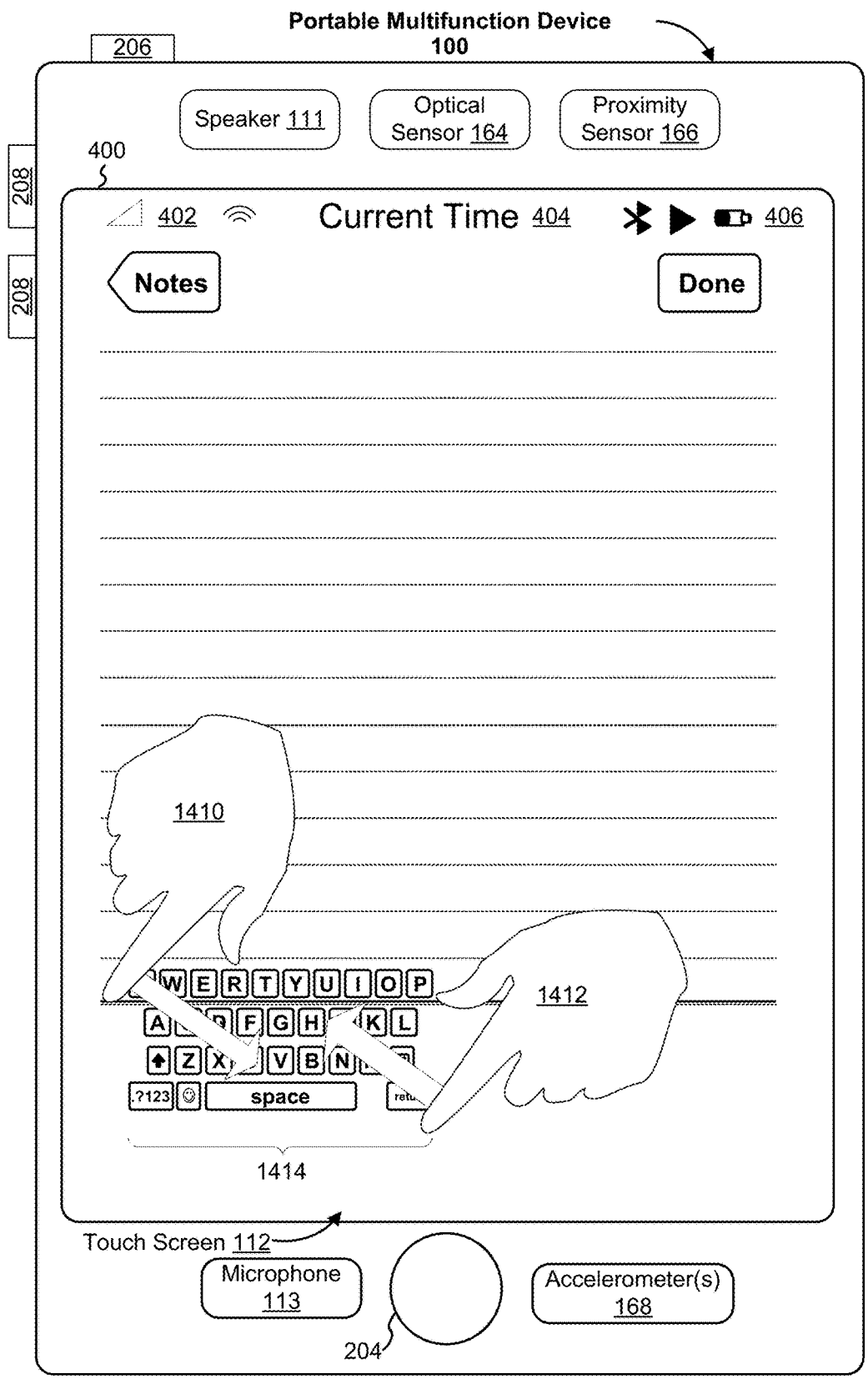

FIG. 14C illustrates the virtual keyboard 1414 decreasing in size in with respect to the pinching gesture made by fingers 1410 and 1412 respectively. As discussed in FIG. 14B, the fingers continue to drag the selections closer to one another. In this example, the decreasing size and positional translation of the virtual keyboard is an animation used during the dragging selection.

Figure 14D:
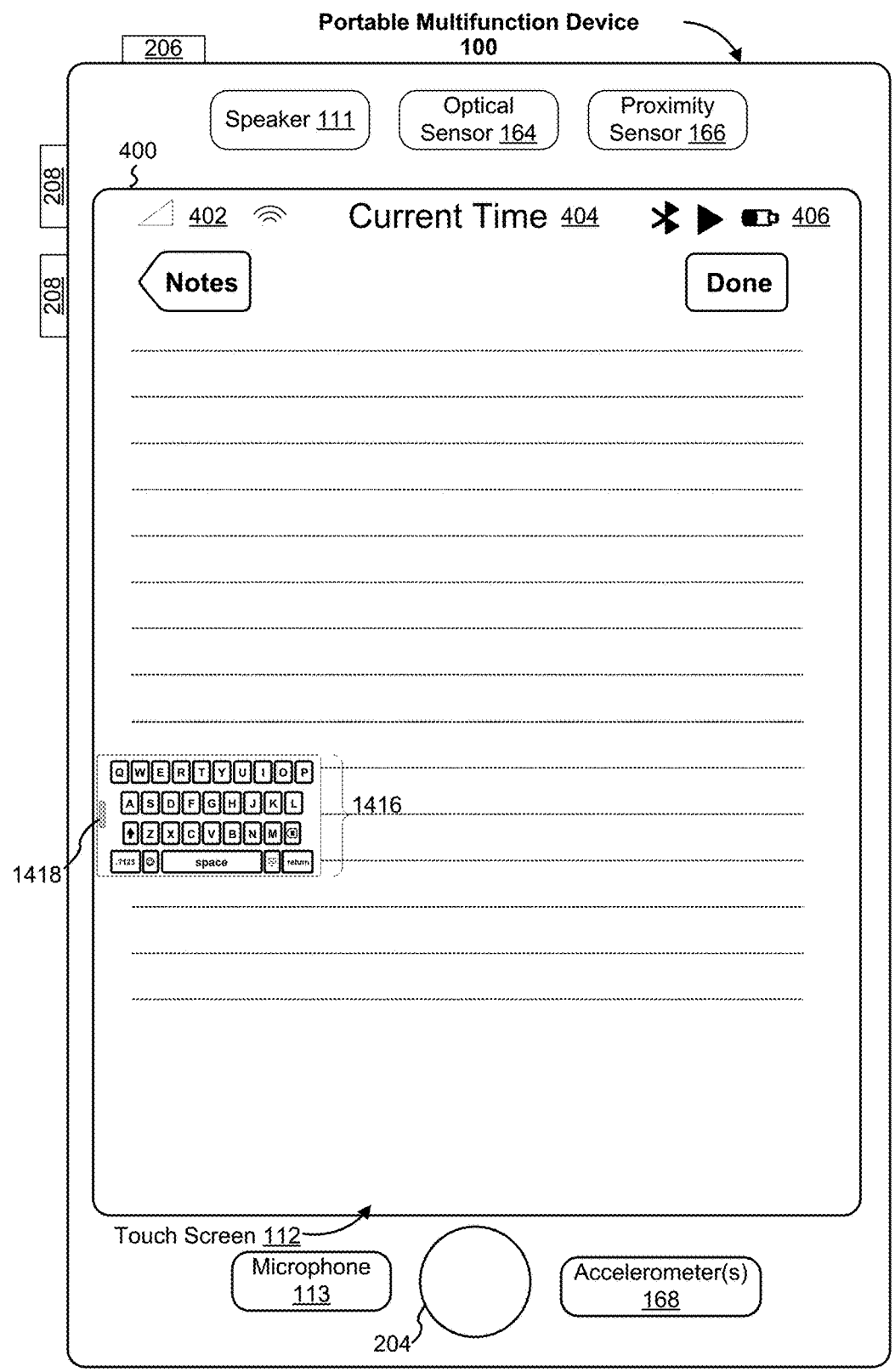

FIG. 14D illustrates a compact virtual keyboard 1416 disposed at the edge of the touch-sensitive display. In this example, the compact virtual keyboard is smaller than standard keyboard. The compact virtual keyboard provides for an affordance 1418 to allow for repositioning. In some embodiments, the compact virtual keyboard has less virtual keys than the virtual keyboard. In some embodiments, the compact virtual keyboard has the same amount of virtual keys as the virtual keyboard.

Figure 14E:
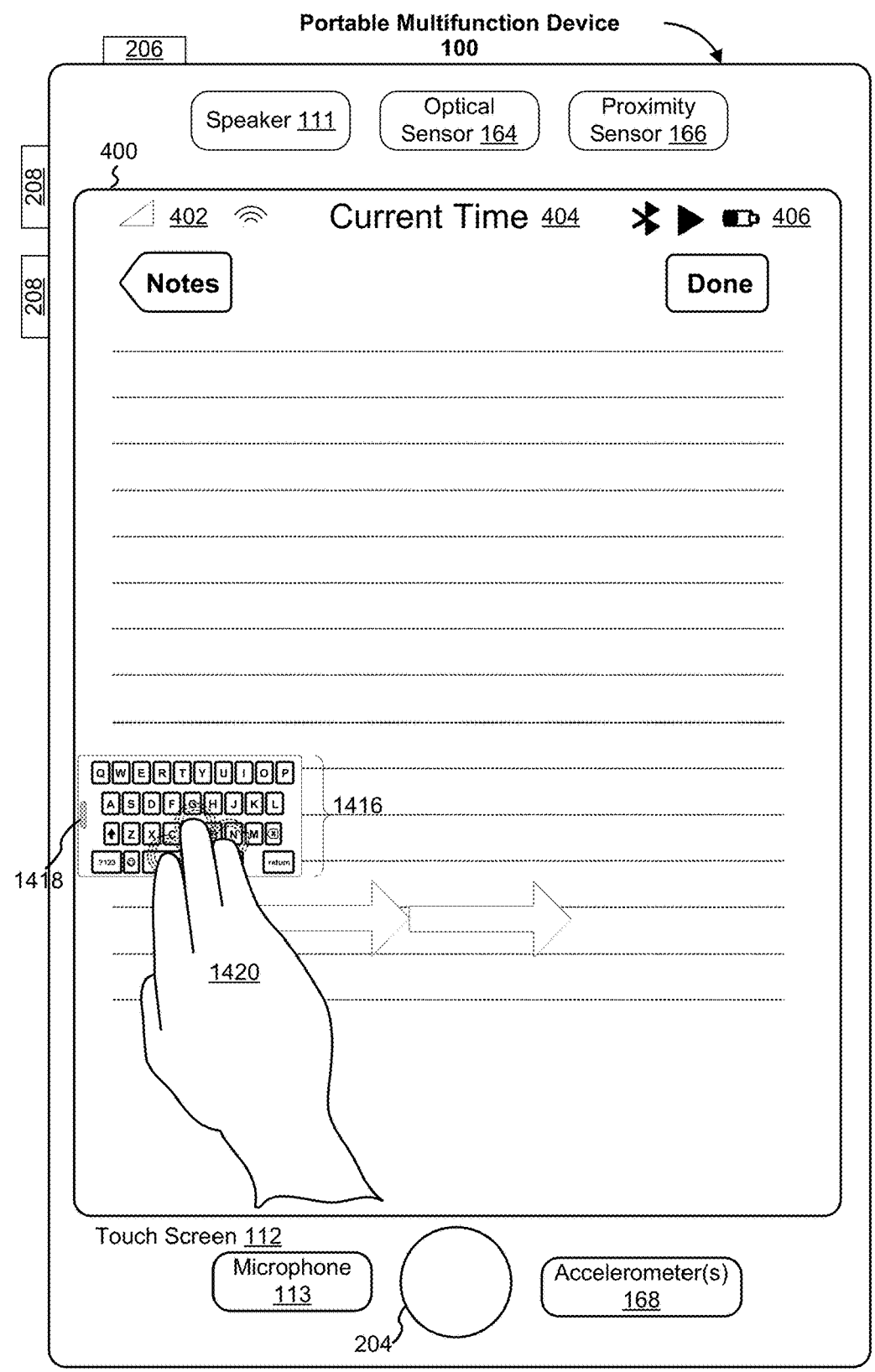

FIG. 14E illustrates a flick gesture 1420 applied to the compact virtual keyboard 1416. In this example, the flick gesture requires two or more fingers swiping the compact virtual keyboard. In some embodiments, the flick must first engage the affordance of the mini virtual keyboard 1418. In some embodiments, the velocity for flicking must meet a predetermined velocity threshold. In some embodiments, all that is required is a one finger flick gesture.

Figure 14F:
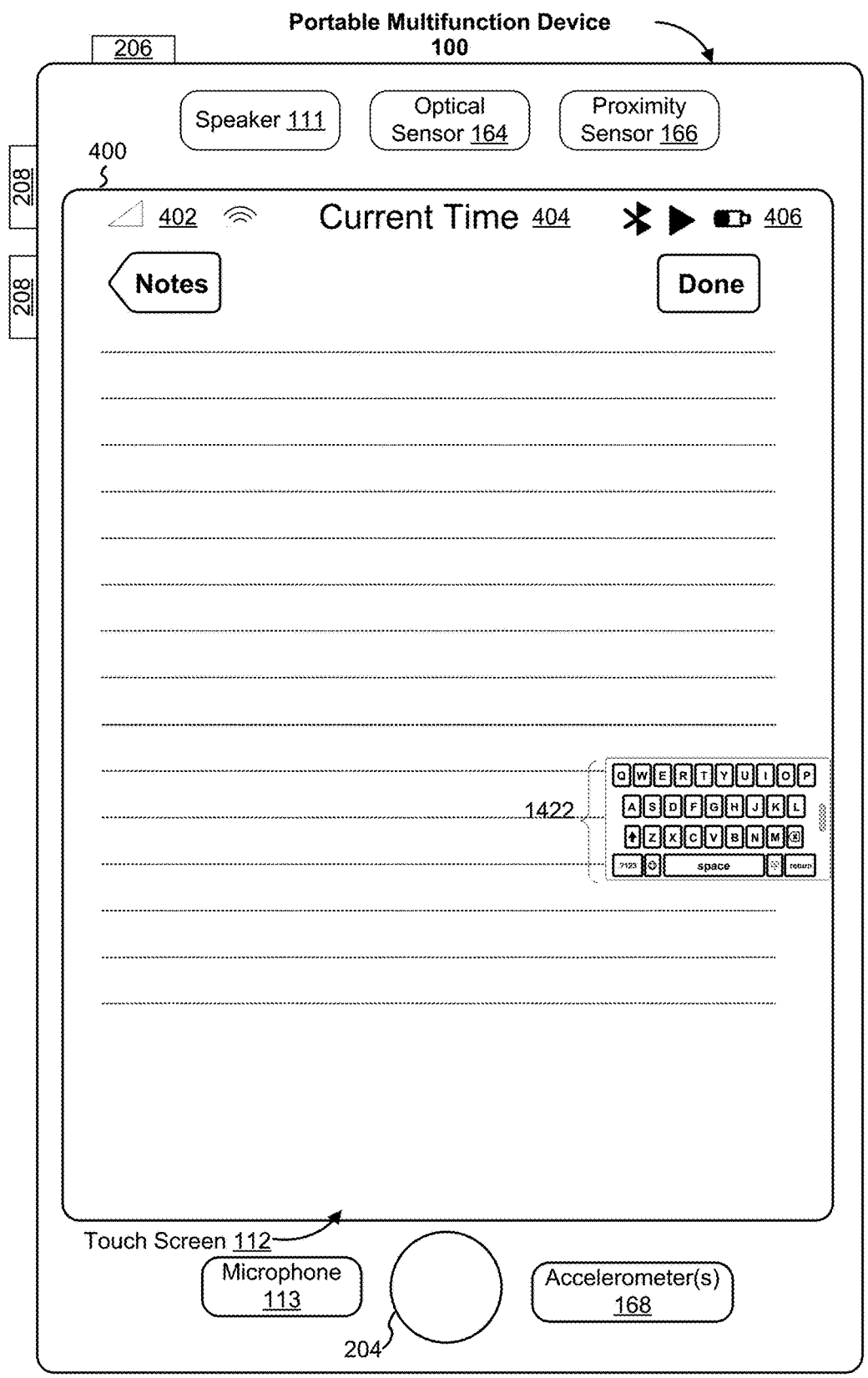

FIG. 14F illustrates the repositioned compact virtual keyboard 1422 disposed at the opposite edge of the touch-sensitive display. In some embodiments, the flick gesture may translate or move the compact virtual keyboard horizontally. In some embodiments, the flick gesture may translate or move the compact virtual keyboard both horizontally and vertically.

FIG. 15 is a flow chart illustrating a method 1500 for selecting virtual keyboard modes in accordance with some embodiments. The method 1500 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display).

As described below, the method 1500 provides an easy way for selecting a compact virtual keyboard for a virtual keyboard.

The device displays (1502) displays a virtual keyboard on the touch-sensitive display. FIG. 14A, for example, displays a virtual keyboard 1402 which has the width of the touch-sensitive display.

Next, the device ceases to display (1504) the virtual keyboard and displays a compact virtual keyboard disposed adjacent a vertical edge of the touch-sensitive display. The compact virtual keyboard is smaller than the virtual keyboard. FIG. 14D, for example, displays a smaller compact virtual keyboard 1416 disposed at the left middle edge of the touch-sensitive display.

In some embodiments, displaying the compact virtual keyboard disposed adjacent the vertical edge of the touch-sensitive display comprises displaying the compact virtual keyboard at or near the vertical edge of the touch-sensitive display (1506).

In some embodiments, the compact virtual keyboard can be moved along the vertical edge of the touch-sensitive display by selecting and dragging an affordance on the compact virtual keyboard (1508). FIG. 14D, for example, illustrates an affordance 1418 attached to the compact virtual keyboard 1416. In some embodiments, the compact virtual keyboard may be dragged up and down along the vertical axis along the edge of the touch-sensitive surface.

In some embodiments, upon detection of a flick gesture on the compact virtual keyboard on the touch-sensitive display, moving the compact virtual keyboard (1510) from the vertical edge of the touch-sensitive display to an opposite vertical edge of the touch-sensitive display. FIGS. 14E and 14F, for example, display a flick gesture 1420 being applied to the compact virtual keyboard 1416 to translate the keyboard to the other edge of the touch-sensitive display 1422. In some embodiments, The flick gesture must have a velocity higher than a predetermined velocity threshold (1512). In some embodiments, the predetermined velocity threshold is assigned. In some embodiments, the predetermined velocity threshold is user defined.

In some embodiments, ceasing to display the virtual keyboard and displaying the compact virtual keyboard comprises animating the virtual keyboard shrinking to the compact virtual keyboard (1514). FIGS. 14B and 14C, for example, illustrate shrinking and positional translation of the virtual keyboard until the virtual keyboard is no longer displayed.

In some embodiments, upon detection of an expanding gesture on the compact virtual keyboard, ceasing to display the compact virtual keyboard and displaying the virtual keyboard (1516).

It should be understood that the particular order in which the operations in FIG. 15 has been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 900, 1200, 1500 are also applicable in an analogous manner to method 1500 described above with respect to FIG. 15. For brevity, these details are not repeated here.

Figure 16:
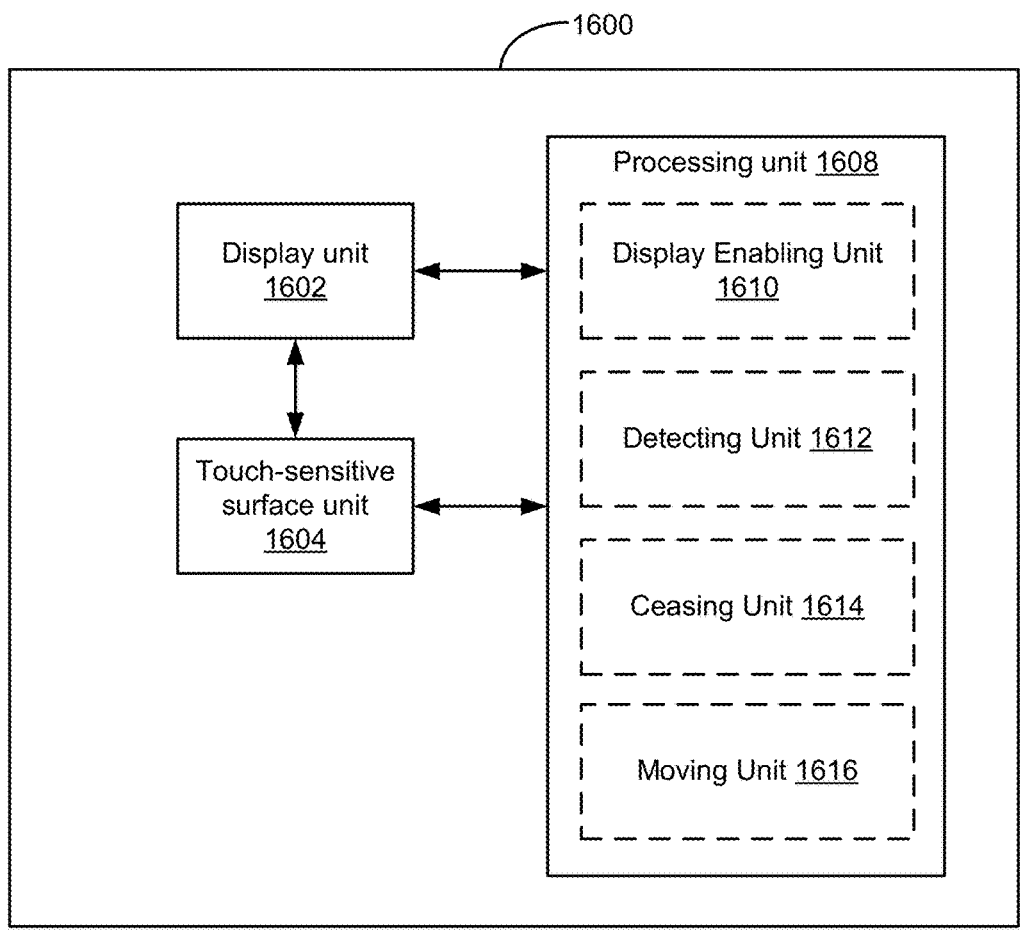
FIG. 16 is a functional block diagram of an electronic device illustrating the modules for selecting a compact virtual keyboard, in accordance with some embodiments.

In accordance with some embodiments, FIG. 16 shows a functional block diagram of an electronic device 1600 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 includes a display unit 1602 configured to display a user interface, a touch-sensitive surface unit 1604 configured to receive contacts and a processing unit 1608 coupled with the display unit 1602 and the touch-sensitive surface unit 1604. In some embodiments, the processing unit 1608 includes: a display enabling unit 1610, a detecting unit 1612, a ceasing unit 1614, and a moving unit 1616.

The processing unit 1608 is configured to: enable display (e.g., with the display enabling unit 1610) of a virtual keyboard on the touch-sensitive display. In response to detection of a gesture, the processing unit is further configured to cease (e.g., with the ceasing enabling unit 1614) to enable display of the virtual keyboard and enable display of a compact virtual keyboard disposed adjacent a vertical edge of the touch-sensitive display. The compact virtual keyboard is smaller than the virtual keyboard.

In some embodiments, enable display of the compact virtual keyboard disposed adjacent the vertical edge of the touch-sensitive display comprises enable display of the compact virtual keyboard at or near the vertical edge of the touch-sensitive display 1604.

In some embodiments, the compact virtual keyboard can be moved along the vertical edge of the touch-sensitive display 1604 by selecting and dragging an affordance on the compact virtual keyboard.

In some embodiments, the processing unit 1608 is further configured to upon detection (e.g., with the detecting unit 1612) of a flick gesture on the compact virtual keyboard on the touch-sensitive display, move (e.g., with the moving unit 1616) the compact virtual keyboard from the vertical edge of the touch-sensitive display to an opposite vertical edge of the touch-sensitive display 1604. In some embodiments, the flick gesture has a velocity higher than a predetermined velocity threshold pm the touch-sensitive display 1604.

In some embodiments, ceasing to display the virtual keyboard and displaying the compact virtual keyboard comprises animating the virtual keyboard shrinking to the compact virtual keyboard on the touch-sensitive surface 1604.

In some embodiments, the processing unit 1608 is further configured to, upon detection (e.g., with the detecting unit 1612) of an expanding gesture on the compact virtual keyboard, ceasing (e.g., with the ceasing unit 1614) to display the compact virtual keyboard and displaying the virtual keyboard The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 15, optionally, implemented by components depicted in FIGS. 1A-1B or FIG. 16. For example, display operation 1502, cease operation 1504, display operation 1506, detection operation 1510, cease operation 1514, and detection operation 1516 are, optionally, implemented by display enabling unit 1610, ceasing unit 1614, display enabling unit 1610, detecting unit 1612, ceasing unit 1614, and detecting unit 1612. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method of toggling between multiple keyboards, comprising:
at an electronic device with a touch-sensitive display:
displaying a first keyboard on the touch-sensitive display, the first keyboard comprising:
a first set of keys corresponding to a set of characters associated with a first language; and
a first designated key displayed at a location on the touch-sensitive display, the first designated key associated with a first function;
wherein the first keyboard is configured such that selection of any of the first set of keys displays, in a text region, one or more characters corresponding to the first language;
receiving a selection to display a second keyboard; and
in response to receiving the selection, displaying the second keyboard on the touch-sensitive display, the second keyboard comprising:
a second set of keys having the set of characters associated with the first language, wherein the second set of keys is displayed in substantially the same positions as the first set of keys; and
a second designated key displayed at the location on the touch-sensitive display that was previously used to display the first designated key, and the second designated key is associated with only a second function different from the first function;
wherein the second function toggles between keyboards, including the second keyboard and a third keyboard, and wherein the second keyboard is configured such that selection of one or more of the second set of keys displays, in the text region, one or more characters corresponding to a second language different from the first language.

2. The method of claim 1, further comprising:
receiving a selection of the second designated key to display the third keyboard; and
in response to receiving the selection, displaying the third keyboard, the third keyboard comprising:
a third set of keys corresponding to the set of characters associated with the first language; and
a third designated key disposed at the location;
wherein the third designated key is the same as the second designated key, and wherein the third keyboard is configured such that selection of any of the third set of keys displays, in the text region, one or more characters corresponding to the first language.

3. The method of claim 2, further comprising:
receiving a selection of the third designated key to display the second keyboard; and
in response to receiving the selection, displaying the second keyboard.

4. The method of claim 2, wherein any of the first, second, and third designated keys is any one of a Caps Lock, shift, or formatting function key of the selected respective keyboard.

5. The method of claim 2, wherein the selection of any of the first, second, and third designated keys is enabled by a single tap selection on the touch-sensitive display.

6. The method of claim 1, wherein the second keyboard and the third keyboard are visually identical.

7. The method of claim 1, wherein the first keyboard is visually identical to both the second keyboard and third keyboard, but for the first designated key.

8. The method of claim 1, wherein the first language is associated with a first autocorrect dictionary, and the second language is associated with a second autocorrect dictionary.

9. The method of claim 1, wherein the first and second sets of keys utilize Roman script.

10. The method of claim 1, wherein receiving the selection to display a second keyboard further comprises:
receiving a selection of a dedicated keyboard switch key, and wherein the dedicated keyboard switch key is included on the first and second keyboards, and the dedicated keyboard switch key is distinct from the first and second designated keys.

11. The method of claim 1, wherein the selection of any of the second set of keys displays, in the text region, pinyin characters corresponding to the second language of the second keyboard.

12. An electronic device for toggling between multiple keyboards, comprising:
a touch-sensitive display;
one or more processors;
memory; and
one or more programs, wherein the one or more programs are stored in the memory and configured to be executed by the one or more processors, the one or more programs including instructions for:
displaying a first keyboard on the touch-sensitive display, the first keyboard comprising:
a first set of keys corresponding to a set of characters associated with a first language; and
a first designated key displayed at a location on the touch-sensitive display, the first designated key associated with a first function;
wherein the first keyboard is configured such that selection of any of the first set of keys displays, in a text region, one or more characters corresponding to the first language;
receiving a selection to display a second keyboard; and
in response to receiving the selection, displaying the second keyboard on the touch-sensitive display, the second keyboard comprising:
a second set of keys having the set of characters associated with the first language, wherein the second set of keys is displayed in substantially the same positions as the first set of keys; and
a second designated key displayed at the location on the touch-sensitive display that was previously used to display the first designated key, and the second designated key is associated with only a second function different from the first function;
wherein the second function toggles between keyboards, including the second keyboard and a third keyboard, and wherein the second keyboard is configured such that selection of one or more of the second set of keys displays, in the text region, one or more characters corresponding to a second language different from the first language.

13. The electronic device of claim 12, wherein the one or more programs further include instructions for:
receiving a selection of the second designated key to display the third keyboard; and
in response to receiving the selection, displaying the third keyboard, the third keyboard comprising:
a third set of keys corresponding to the set of characters associated with the first language; and
a third designated key disposed at the location;
wherein the third designated key is the same as the second designated key, and wherein the third keyboard is configured such that selection of any of the third set of keys displays, in the text region, one or more characters corresponding to the first language.

14. The electronic device of claim 13, wherein the one or more programs further include instructions for:
receiving a selection of the third designated key to display the second keyboard; and
in response to receiving the selection, displaying the second keyboard.

15. The electronic device of claim 13, wherein the selection of any of the first, second, and third designated keys is enabled by a single tap selection on the touch-sensitive display.

16. The electronic device of claim 12, wherein the first language is associated with a first autocorrect dictionary, and the second language is associated with a second autocorrect dictionary.

17. A non-transitory computer readable storage medium for toggling between multiple keyboards, the computer readable storage medium storing one or more programs, the one or more programs comprising instructions, which, when executed by an electronic device with a touch-sensitive display, cause the device to:
display a first keyboard on the touch-sensitive display, the first keyboard comprising:
a first set of keys corresponding to a set of characters associated with a first language; and
a first designated key displayed at a location on the touch-sensitive display, the first designated key associated with a first function;
wherein the first keyboard is configured such that selection of any of the first set of keys displays, in a text region, one or more characters corresponding to the first language;
receive a selection to display a second keyboard; and
in response to receiving the selection, display the second keyboard on the touch-sensitive display, the second keyboard comprising:
a second set of keys having the set of characters associated with the first language, wherein the second set of keys is displayed in substantially the same positions as the first set of keys; and
a second designated key displayed at the location on the touch-sensitive display that was previously used to display the first designated key, and the second designated key is associated with only a second function different from the first function;
wherein the second function toggles between keyboards, including the second keyboard and a third keyboard, and wherein the second keyboard is configured such that selection of one or more of the second set of keys displays, in the text region, one or more characters corresponding to a second language different from the first language.

18. The non-transitory computer readable storage medium of claim 17, wherein the one or more programs further include instructions, which, when executed by the electronic device, cause the device to:
receive a selection of the designated key to display the third keyboard; and
in response to receiving the selection, display the third keyboard, the third keyboard comprising:
a third set of keys corresponding to the set of characters associated with the first language; and
a third designated key disposed at the location;
wherein the third designated key is the same as the second designated key, and wherein the third keyboard is configured such that selection of any of the third set of keys displays, in the text region, one or more characters corresponding to the first language.

19. The non-transitory computer readable storage medium of claim 17, wherein the one or more programs further include instructions, which, when executed by the electronic device, cause the device to:
receive a selection of the third designated key to display the second keyboard; and
in response to receiving the selection, display the second keyboard.

20. The non-transitory computer readable storage medium of claim 17, wherein the first language is associated with a first autocorrect dictionary, and the second language is associated with a second autocorrect dictionary.

* * * * *